(12) United States Patent
Chipman

(10) Patent No.: US 8,141,064 B2
(45) Date of Patent: Mar. 20, 2012

(54) METHOD AND SYSTEM FOR PROGRAM TRANSFORMATION USING FLOW-SENSITIVE TYPE CONSTRAINT ANALYSIS

(75) Inventor: Timothy Chipman, Ames, IA (US)

(73) Assignee: Lantronix, Inc., Irvine, CA (US)

( * ) Notice: Subject to any disclaimer, the term of this patent is extended or adjusted under 35 U.S.C. 154(b) by 601 days.

(21) Appl. No.: 12/333,084

(22) Filed: Dec. 11, 2008

(65) Prior Publication Data

US 2009/0094588 A1    Apr. 9, 2009

Related U.S. Application Data

(62) Division of application No. 10/791,110, filed on Mar. 2, 2004, now Pat. No. 7,669,193.

(60) Provisional application No. 60/505,792, filed on Sep. 25, 2003, provisional application No. 60/505,854, filed on Sep. 25, 2003.

(51) Int. Cl.
*G06F 9/45* (2006.01)

(52) U.S. Cl. ........ 717/154; 717/140; 717/141; 717/146; 717/151; 717/152; 717/155; 717/156; 717/157

(58) Field of Classification Search .......... None
See application file for complete search history.

(56) References Cited

U.S. PATENT DOCUMENTS

| | | | |
|---|---|---|---|
| 5,493,675 A | 2/1996 | Faiman et al. | |
| 5,577,253 A | 11/1996 | Blickstein | |
| 5,613,117 A | 3/1997 | Davidson et al. | |
| 5,671,419 A | 9/1997 | Carini et al. | |
| 5,836,014 A | 11/1998 | Faiman, Jr. | |
| 5,862,384 A | 1/1999 | Hirai | |
| 6,115,811 A | 9/2000 | Steele, Jr. | |
| 6,219,832 B1 | 4/2001 | Buzbee | |
| 6,230,314 B1 * | 5/2001 | Sweeney et al. | 717/108 |
| 6,301,700 B1 * | 10/2001 | Choi et al. | 717/116 |
| 6,381,735 B1 | 4/2002 | Hunt | |
| 6,446,258 B1 | 9/2002 | McKinsey et al. | |
| 6,473,897 B1 | 10/2002 | Ansari et al. | |
| 6,519,765 B1 | 2/2003 | Kawahito et al. | |
| 6,546,551 B1 | 4/2003 | Sweeney et al. | |
| 6,662,359 B1 | 12/2003 | Berry et al. | |
| 6,848,111 B1 | 1/2005 | Schwabe et al. | |
| 6,865,730 B1 * | 3/2005 | Burke et al. | 717/116 |
| 6,957,422 B2 | 10/2005 | Hunt | |
| 7,069,548 B2 | 6/2006 | Kushlis | |
| 7,240,343 B2 | 7/2007 | Ogasawara | |

(Continued)

OTHER PUBLICATIONS

Pande et al., "Data-flow-based virtual function resolution,"1996.*

(Continued)

*Primary Examiner* — Insun Kang
(74) *Attorney, Agent, or Firm* — Hani Z. Sayed; Rutan & Tucker, LLP

(57) ABSTRACT

A method for analyzing a program is provided. The method includes, determining an object type that may exist at an execution point of the program, wherein this enables determination of possible virtual functions that may be called; creating a call graph at a main entry point of the program; and recording an outgoing function call within a main function. The method also includes analyzing possible object types that may occur at any given instruction from any call path for virtual calls, wherein possible object types are determined by tracking object types as they pass through plural constructs; and calling into functions generically for handling specialized native runtime type information.

8 Claims, 31 Drawing Sheets

U.S. PATENT DOCUMENTS

| | | | | |
|---|---|---|---|---|
| 2002/0129343 A1* | 9/2002 | Pinter et al. | | 717/140 |
| 2004/0205740 A1* | 10/2004 | Lavery et al. | | 717/151 |
| 2005/0149904 A1* | 7/2005 | Ball et al. | | 717/100 |

OTHER PUBLICATIONS

Mikheev et al., "Compiler-cooperative memory management in Java," Springer, 2001.*

Hind et al., "Interprocedural pointer alias analysis," ACM, 1999.*

Sundaresan et al., "Practical virtual method call resolution for Java," ACM, 2000.*

Choi et al. "Escape analysis for Java," ACM, 1999.*

Fitzgerald et al., "Marmot: An optimizing compiler for Java," Citeseer, 2000.*

S. Bhakthavasalam, "Measuring the Perceived Overhead Imposed by Object-Oriented Programming in a Real-time Embedded System", Blacksburg, VA, May 16, 2003.

D.F. Bacon and Peter F. Sweeney, "Fast Static Analysis of C++ Virtual Function Calls", IBM Watson Research Center.

I. Pechtchanski and V. Sarkar, in "Dynamic Optimistic Interprocedural Analysis: A Framework and an Application".

On Reducing Interprocess Communication Overhead in Concurrent Programs, Erik Stenman et al., ACM, 2002, 6 pages.

Ogasawara, Takeshi, et al., "A Study of Exception Handling and Its Dynamic Optimization in Java", ACM 2001, pp. 83-95.

Glynn, Kevin, "Exception Analysis for Non-Strict Languages", ACM, 2002, pp. 98-109.

Bacon, David F., et al., "Fast Static Analysis of C++ Virtual Function Calls", ACM, 1996, pp. 324-341.

* cited by examiner

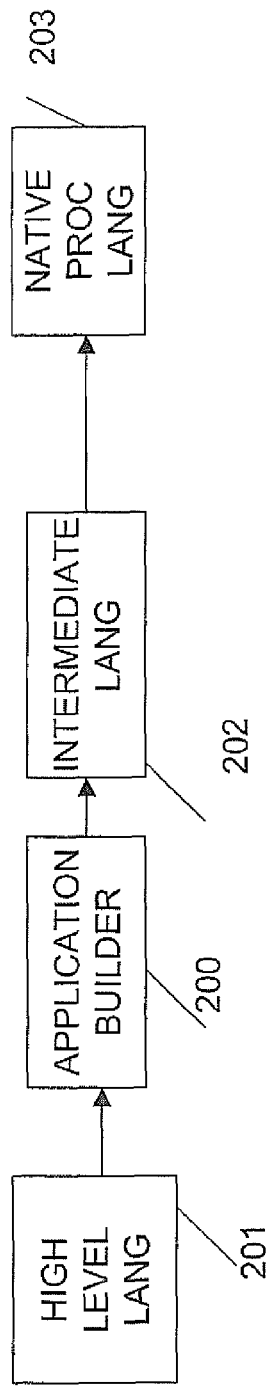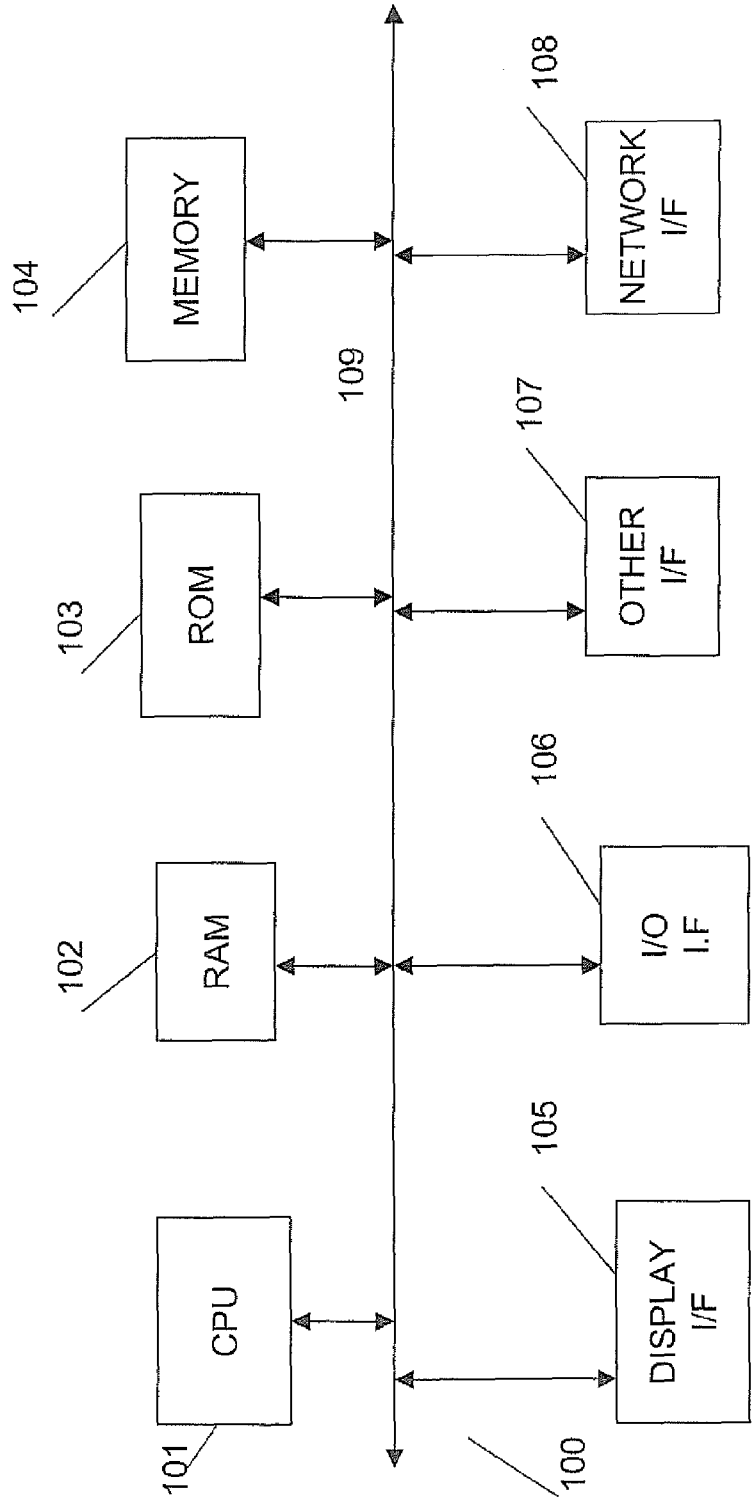

METHOD AND SYSTEM FOR PROGRAM TRANSFORMATION USING FLOW-SENSITIVE TYPE CONSTRAINT ANALYSIS

CROSS REFERENCE TO RELATED APPLICATION

This patent application is a divisional application which claims priority under 35 USC 119(e) to the U.S. patent application Ser. No. 10/791,110, filed on Mar. 2, 2004 now issued as U.S. Pat. No. 7,669,193 on Feb. 23, 2010 and provisional patent applications filed on Sep. 25, 2003, Ser. Nos. 60/505,792 and 60/505,854, entitled "Method AND SYSTEM FOR PROGRAM TRANSFORMATION USING FLOW-SENSITIVE TYPE CONSTRAINT ANALYSIS", AND "SYSTEM AND METHOD FOR DEBUGGIN SOFTWARE APPLICATIONS RUNNING ON REMOTE DEVICES", RESPECTIVELY. The disclosures of the foreign applications are incorporated herein by reference in their entirety.

BACKGROUND OF THE INVENTION

1. Field of the Invention

The present invention relates to object-oriented programming ("OOP"), and more particularly, to using flow-sensitive constraint analysis for reducing dead code.

2. Background

MRTE (managed runtime environment) is a platform that abstracts the specifics of an operating system and the architecture running underneath it. Instead of writing programs that directly command a processor, software developers write to a "runtime" that handles many of the generic tasks that programmers used to have to anticipate and build. Managed runtime can handle tasks like heap management, security, garbage collection, and memory allocation. This allows developers to concentrate on business logic specific to their application. Because of runtime's close relationship with the operating system and architecture, it's often called a "virtual machine."

Several MRTEs have been commercialized, including IBM's SmallTalk™ language and runtime, Sun Microsystem's Java™ language and runtime, and Microsoft's .NET™ common language runtime (referred to as "CLR").

Object-oriented programming languages used in MRTEs provide a number of features such as classes, class members, multiple inheritance, and virtual functions. These features enable the creation of class libraries that can be reused in many different applications. However, such code reuse comes at a price. In order to facilitate reusability, OOP encourages the design of classes that incorporate a high degree of functionality. Programs that use a class library typically exercise only a part of the library's functionality. Such a program may pay a memory penalty for library functionality that it does not use.

A library may contain dead executable code. Dead executable code is code that is not executed during execution of the program, or code whose execution cannot affect the program's observable behavior. Dead executable code in an application adversely affects memory requirements and is hence undesirable. Dead executable code may also take the form of unused library procedures.

Virtual functions are operations that are declared in a base class, but may have different implementations in subclasses. Typically, virtual functions count for a substantial portion of dead executable code. When program code that is written to operate on any object (either an object of the base class or any of its subclasses) makes method calls, the correct implementation of the method in question must be used. As a result, no fixed code address can be associated with that method call—a different address must be used depending on the particular (sub)class to which the object belongs. [S. Bhakthavatsalam, "Measuring the Perceived Overhead Imposed by Object-Oriented Programming in a Real-time Embedded System", Blacksburg, Va., May 16, 2003].

Prior art has addressed the problem of eliminating some, but not all unused virtual functions. An example of such prior art is provided in the white papers by D. F. Bacon and Peter F. Sweeney, "Fast Static Analysis of C++ Virtual Function Calls", IBM Watson Research Center, and by A. Srivastava, "Unused procedures in object-oriented programming", ACM Letters on Programming Languages and Systems, 1(4), pp. 355-364.

Such prior art methods only partially eliminate non-virtual functions, and hence, the problem of dead code still remains.

Other prior art technique address eliminating virtual functions in MRTEs by performing inter-procedural analysis of object types; as discussed by I. Pechtchanski and V. Sarkar, in "Dynamic Optimistic Interprocedural Analysis, a Framework and an Application".

Such techniques track object types at a global level and do not take into consideration the possible variance of object types based on specific instructions within specific functions called by specific execution paths. For example, such conventional techniques track a local variable type that may be limited to say A or B during the lifetime of the program but do not track a local variable type that is exactly B at a specific instruction following a specific execution path. For field access, such conventional techniques track say field F of class T that may be limited to A or B during the lifetime of the program, but do not track that instance Q of class T that has field F always set to B at a specific instruction following a specific execution path. In practice, this is very significant, as such prior art approaches yield exponentially larger sets of included functions that are never called.

Prior art also does not specify a mechanism for calling into native functions that may return variable types where it is not possible to analyze the native functions. Nor does it specify a mechanism for automatically handling dynamic-type-driven functions that may call functions indirectly by inspecting the type information (also referred to as metadata) at runtime. Prior art only provides a mechanism using manually-generated configuration files to specify which functions should be preserved (Sweeney, et. al, U.S. Pat. No. 6,546,551, "Method for accurately extracting library-based object-oriented applications"). Prior art fails to suggest an approach to automatically determine functions on the basis of local flow-sensitive type constraint analysis.

Conventional techniques are flow insensitive and not flow sensitive. Flow insensitive approach tracks variable types globally (at a program level), without giving any consideration to how a variable is used at a specific instruction of a specific function and call path.

These issues are magnified when considering modern MRTEs that specify extensive standard framework libraries with millions of virtual function calls and deep inheritance chains such as Microsoft's .NET®. Using prior art methods in practice, a program that calls into a simple framework function such as formatting a text string yields dependencies on thousands of downstream virtual functions that are never called effectively, and string formatting functions are included for every instantiated object type, regardless if these functions are actually used.

Modern MRTEs primarily reside in personal computers or handheld environments with enough memory to easily hold entire class libraries (in the order of 64 megabytes). Such environments are typically used in an environment where multiple application programs use common class libraries and underlying operating system functions. Because of the nature of these environments, it is beneficial for performance and interoperability to maintain a single set of class libraries that are shared across applications in their complete form. Thus, there is limited, if any, benefit of determining dead executable code in such environments.

However, dead code becomes a major problem for smaller systems, for example, embedded systems, because memory is extremely limited, and such devices typically perform a specific application and do need to use a massive single set of class libraries. An example of one such embedded system is the Lantronix XPORT™ sold by Lantronix Inc.

Therefore, there is a need for a system and method for efficiently interpreting a program function calls and minimizing dead code.

SUMMARY OF THE INVENTION

In one aspect of the present invention, a method for analyzing a program for is provided. The method includes, determining a set of functions required by the program by performing local type constraint analysis at intermediate language instruction level and every call path that may reach the function containing such instruction.

The method also includes, analyzing a program instruction that accesses an object field, wherein the analysis is performed locally to an object instantiation; analyzing a program instructions that accesses an array element locally to an array instantiation; analyzing a program instruction that accesses a runtime information for each local runtime symbol usage; and/or analyzing a program instruction within an exception handler performed locally to an exception instruction.

In another aspect of the present invention, a computer-readable medium storing computer-executable process steps of a process for analyzing a program is provided. The media includes, process steps determining a set of functions required by the program by performing local type constraint analysis at intermediate language instruction level and every call path that may reach the function containing such instruction.

The media also includes process steps for analyzing a program instruction that accesses an object field, wherein the analysis is performed locally to an object instantiation; analyzing a program instructions that accesses an array element locally to an array instantiation; analyzing a program instruction that accesses a runtime information for each local runtime symbol usage; and/or analyzing a program instruction within an exception handler performed locally to an exception instruction.

In yet another aspect, a method for analyzing a program is provided. The method includes, determining an object type that may exist at an execution point of the program, wherein this enables determination of possible virtual functions that may be called; creating a call graph at a main entry point of the program; and recording an outgoing function call within a main function.

The method also includes analyzing possible object types that may occur at any given instruction from any call path for a virtual call, wherein possible object types are determined by tracking object types as they pass through plural constructs; and calling into functions generically for handling specialized native runtime type information.

In yet another aspect of the present invention, a computer-readable medium storing computer-executable process steps of a process for analyzing a program is provided. The media includes process steps for determining an object type that may exist at an execution point of the program, wherein this enables determination of possible virtual functions that may be called; creating a call graph at a main entry point of the program; and recording an outgoing function call within a main function.

The media also includes, analyzing possible object types that may occur at any given instruction from any call path for all virtual calls, wherein possible object types are determined by tracking object types as they pass through plural constructs; and calling into functions generically for handling specialized native runtime type information.

In yet another aspect of the present invention, a method for building an application is provided. The method includes, receiving source code instruction; determining optimum code requirement; and compiling native processor image. The optimum code is determined by performing a flow-sensitive analysis that determines possible types of objects that may exist at any instruction of a program. Also, based on a set of constraints, virtual functions that have the potential of being executed are determined, which minimizes the amount of code required for the application.

In yet another aspect of the present invention, dead code (or virtual functions) is handled efficiently, which improves overall system performance.

In yet another aspect of the present invention, a method for determining variable size in a program is provided. The method includes, tracking variable size; and reducing variable size for program execution. If a variable is discrete, then it is hard coded to a single value. If a first variable is assigned to a second variable, then a size constraint of the first variable is merged into a size constraint of the second variable.

In yet another aspect of the present invention, a computer-readable medium storing computer-executable process steps of a process for determining variable size in a program is provided. The process steps include, tracking variable size; and reducing variable size for program execution.

In yet another aspect of the present invention, a method for reducing empty function calls in a program is provided. The method includes, determining if a call is made to an empty function; and removing a call that is made to an empty function.

In yet another aspect of the present invention, a computer-readable medium storing computer-executable process steps of a process for reducing empty function calls in a program is provided. The process includes, determining if a call is made to an empty function; and removing a call that is made to an empty function.

In yet another aspect of the present invention, a method for reducing throw instruction without exception handlers in a program is provided. The method includes, determining if there are any throw instructions without exception handlers; and removing throw instructions without exception handlers.

In yet another aspect of the present invention, a computer-readable medium storing computer-executable process steps of a process for reducing throw instruction without exception handlers in a program is provided. The process includes, determining if there are any throw instructions without exception handlers; and removing throw instructions without exception handlers.

In yet another aspect of the present invention, a method for discarding comparison instructions in a program is provided. The method includes, determining if there are any comparison instructions with discrete values in the program and discarding a comparison instruction with a discrete value.

In yet another aspect of the present invention, a computer-readable medium storing computer-executable process steps of a process for discarding comparison instructions in a program is provided. The process includes, determining if there are any comparison instructions with discrete values in the program; and discarding a comparison instruction with a discrete value.

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

The foregoing features and other features of the present invention will now be described. In the drawings, the same components have the same reference numerals. The illustrated embodiment is intended to illustrate, but not to limit the invention. The drawings include the following Figures:

FIG. 1 is a block diagram of the internal architecture of a system using the executable process steps, according to one aspect of the present invention;

FIG. 2A is a block diagram showing intermediate language with respect to source code and native processor code;

FIGS. 24-26 show screen shots of an application builder using a static type analysis, according to one aspect of the present invention;

DETAILED DESCRIPTION OF THE PREFERRED EMBODIMENTS

Figure 2B:
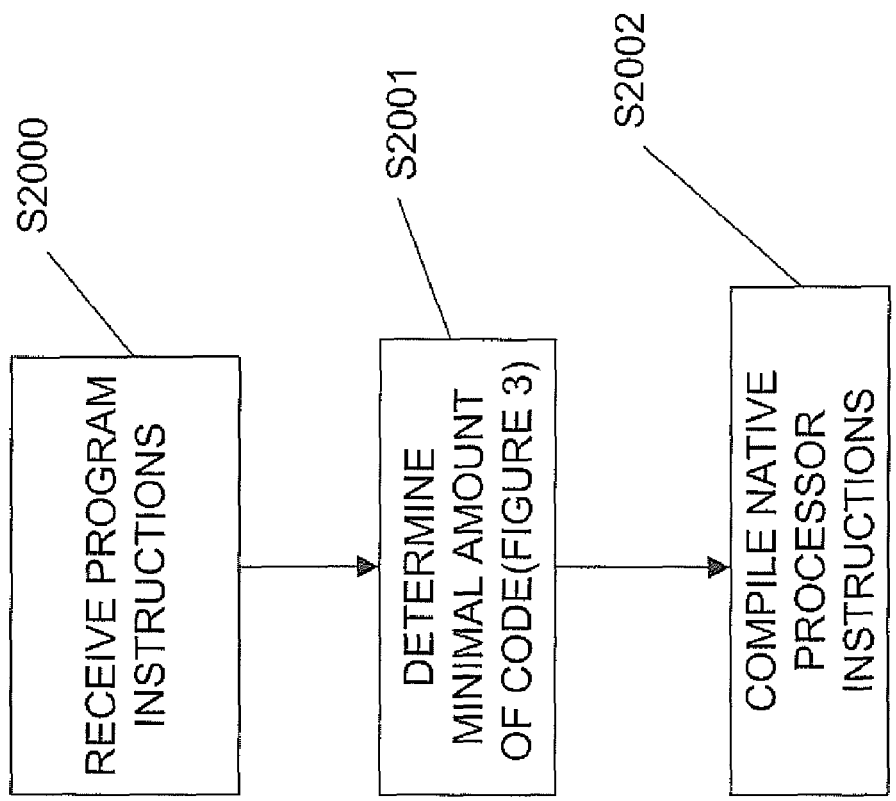
FIG. 2B is a flow diagram of executable process steps for building an application with minimal code, according to one aspect of the present invention.

To facilitate an understanding of the preferred embodiment, the general architecture and operation of a computing system (including embedded systems) will initially be described. The specific architecture and operation of the preferred embodiment will then be described with reference to the general architecture.

FIG. 1 is a block diagram of an embedded system for executing computer executable process steps according to one aspect of the present invention.

In FIG. 1, system 100 includes a central processor ("CPU") 101 for executing computer-executable process steps and interfaces with a computer bus 109. A Pentium® based processor may be used as CPU 101. The invention is not limited to any particular type or speed of processor 101.

Memory 104 stores operating system program files, application program files, and other files. Some of these files are stored on using an installation program. For example, CPU 101 executes computer-executable process steps of an installation program so that CPU 101 can properly execute the application program.

Random access memory ("RAM") 102 also interfaces to bus 109 to provide CPU 101 with access to memory storage. When executing stored computer-executable process steps from memory 104 (or other storage media or remotely downloading the instructions via a network connection), CPU 101 stores and executes the process steps out of RAM 102.

Read only memory ("ROM") 103 is provided to store invariant instruction sequences such as start-up instruction sequences or basic input/output operating system (BIOS) sequences for operation of input/output devices.

System 100 includes a display device interface 105 that allows data to be displayed on a display device, Network interface 108 allows network connectivity to system 100 including without limitation, connectivity to the world wide web ("WWW"). Computer-executable process steps, according to one aspect of the present invention may be downloaded via network interface 108.

Input/Output interface 106 allows connectivity to I/O devices for example, a mouse and/or keyboard. Other interface 107 may be used for connecting a peripheral device to system 100.

It is noteworthy that the present invention is not limited to the FIG. 1 architecture. For example, other embedded systems, notebook or laptop computers, handheld devices, set-top boxes or any other system capable of running computer-executable process steps, as described below, may be used to implement the various aspects of the present invention.

It is also noteworthy that the foregoing architecture has been described to show one example of a system that can be used to run the executable process steps according to the present invention. The foregoing is not intended to limit the present invention. The various blocks may be combined or separated. For example, other I/F 107 module can include various sub-blocks for different devices, for example, printers, scanners etc.

FIG. 2A shows a top level block diagram of the software architecture that is used for executing the process steps of the present invention. Application builder 200 compiles high level language 201 instructions (source code instructions) to an intermediate programming language 202. Examples of high level language are C++, Java, Perl or COBOL etc.

Intermediate language (also referred to herein as "IL") 202 is designed to be low level enough such that converting to native processor code 203 is fast, yet high level enough such that it is possible to validate programs for stability and correctness. Intermediate language 202 is similar to Microsoft-.Net common language runtime ("CLR") and defines execution behavior. The CLR specification as provided by Microsoft® is incorporated herein by reference in its entirety.

In Intermediate language 202, functions are organized into classes which make it easy to locate and manage code. The capability to call virtual functions simplifies code, and permits greater reusability, by allowing code to be written in a more generic fashion. For example, a protocol can be written that is indifferent to whether it's communicating across a serial port, over the Internet, or to a file.

In one aspect of the present invention, application builder 200 allows programmers to build efficient applications that can run on embedded systems with small memory storage space. A programmer selects an executable (.EXE) application file and the application is converted to a compatible image.

Application builder 200 determines the minimal amount of code that is required, as discussed below with respect to FIGS. 3 and 4A-23. Application builder 200 uses a constraint analysis to determine which virtual functions have the potential of being executed. Application builder 200 provides visibility to functions which are required and also to the chain of dependencies. A dependency graph shows the hierarchy of calls into and out of functions as described below. Application builder 200, before running an application shows the possible object types that may exist at every instruction of an application. This allows a programmer to determine and solve program bottlenecks and hence, minimizes virtual functions and dead code, according to one aspect of the present invention. This is especially useful in embedded systems where memory is a major constraint.

In one aspect of the present invention, a method and system is provided to minimize code requirements that is especially useful for embedded systems, for example, the Lantronix XPORT™. Each function in a program is analyzed recursively to determine which other functions are called throughout the program. The process starts at the main entry point function and includes each function that is called.

In another aspect of the present invention, code for virtual function calls is minimized. In a virtual function call, the called function is not the same as the executed function, which depends upon the object at runtime. The process according to the present invention evaluates all possible "types" that are created at every instruction of a program and carries them through a stack evaluation.

If an object is stored in a field and retrieved later in a program, then the process keeps track of each type and keeps track of that information as it passes through function calls. The same is true if an object is stored in an array element. The present information provides plural data types that hold information about all the possible types in a program.

FIG. 2B is a flow diagram of executable process steps used by application builder 200, according to one aspect of the present invention.

Turning in detail to FIG. 2B, in step S2000, application builder 200 receives source code instructions.

In step S2001, application builder 200 determines the minimal amount of code that is required by a program. This step is described below in detail with respect to FIG. 3.

In step S2002, application builder 200 compiles the program to native processor language 203 instructions.

Figure 3:
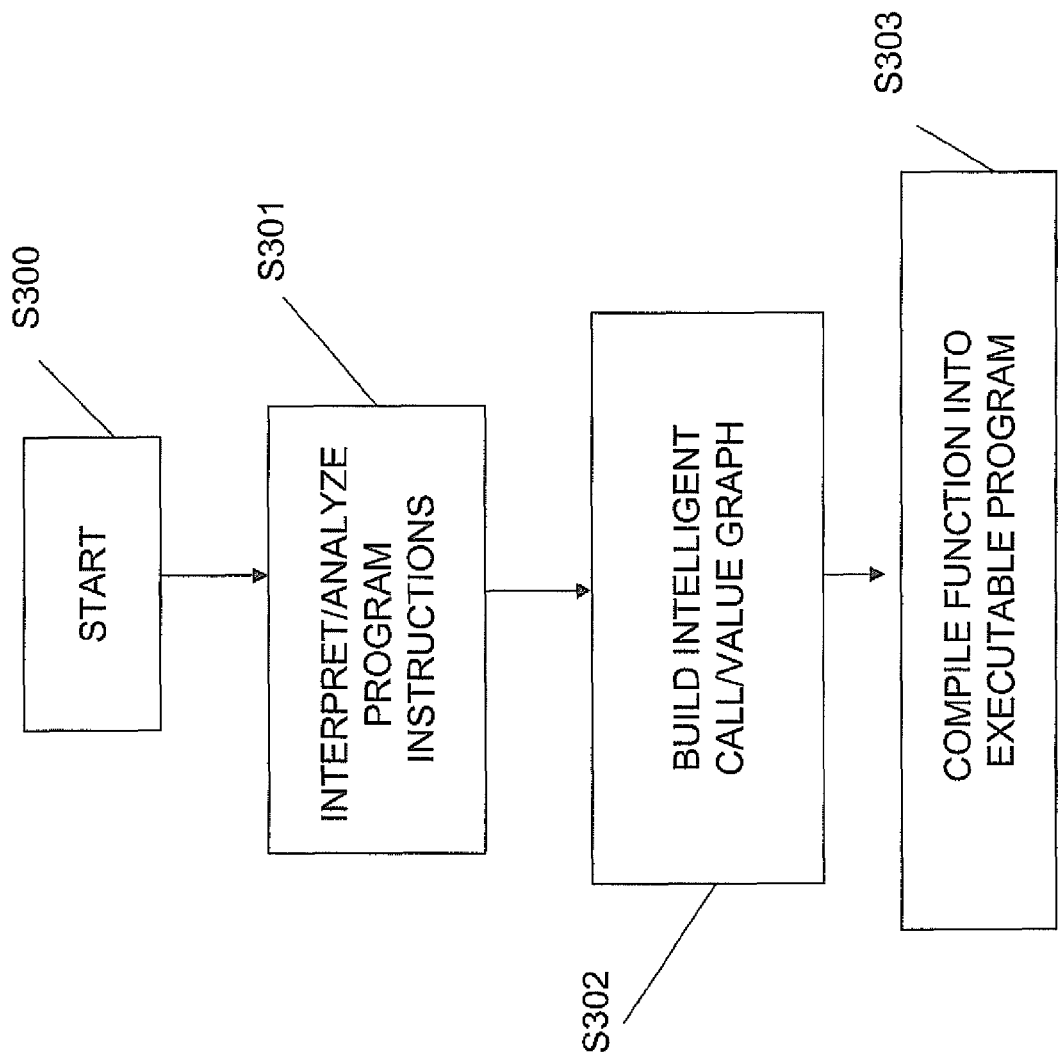
FIG. 3 is a flow diagram of executable process steps for a static type analysis, according to one aspect of the present invention.

FIG. 3 is a top-level flow diagram of executable process steps according to one aspect of the present invention that minimizes dead code. Turning in detail to FIG. 3, in step S300, the process starts. Program instructions in the intermediate language 202 are received by CPU 101.

In step S301, the process interprets/analyzes the computer instructions. In one aspect, the process analyzes a program by starting at the main entry point and iterating through the instructions of the function linearly. While some of these instructions may comprise conditional or unconditional behavior, where the actual program execution is not linear, the declared types of objects on a stack of any instruction do not vary based on intra-function flow behavior, since that is a requirement of MRTE. This does not preclude different types from existing on the stack depending on intra-function flow behavior, it merely limits the type analysis to such that can be determined by static type analysis without attempting to execute or determine values or intra-function flow behavior as part of the process. The process determines the possible type of values that the instruction can have. It is noteworthy that the process does not try and predict the actual outcome of the program instruction, but instead predicts the "type" of outcome or the constraints of the outcome.

Figure 4A:
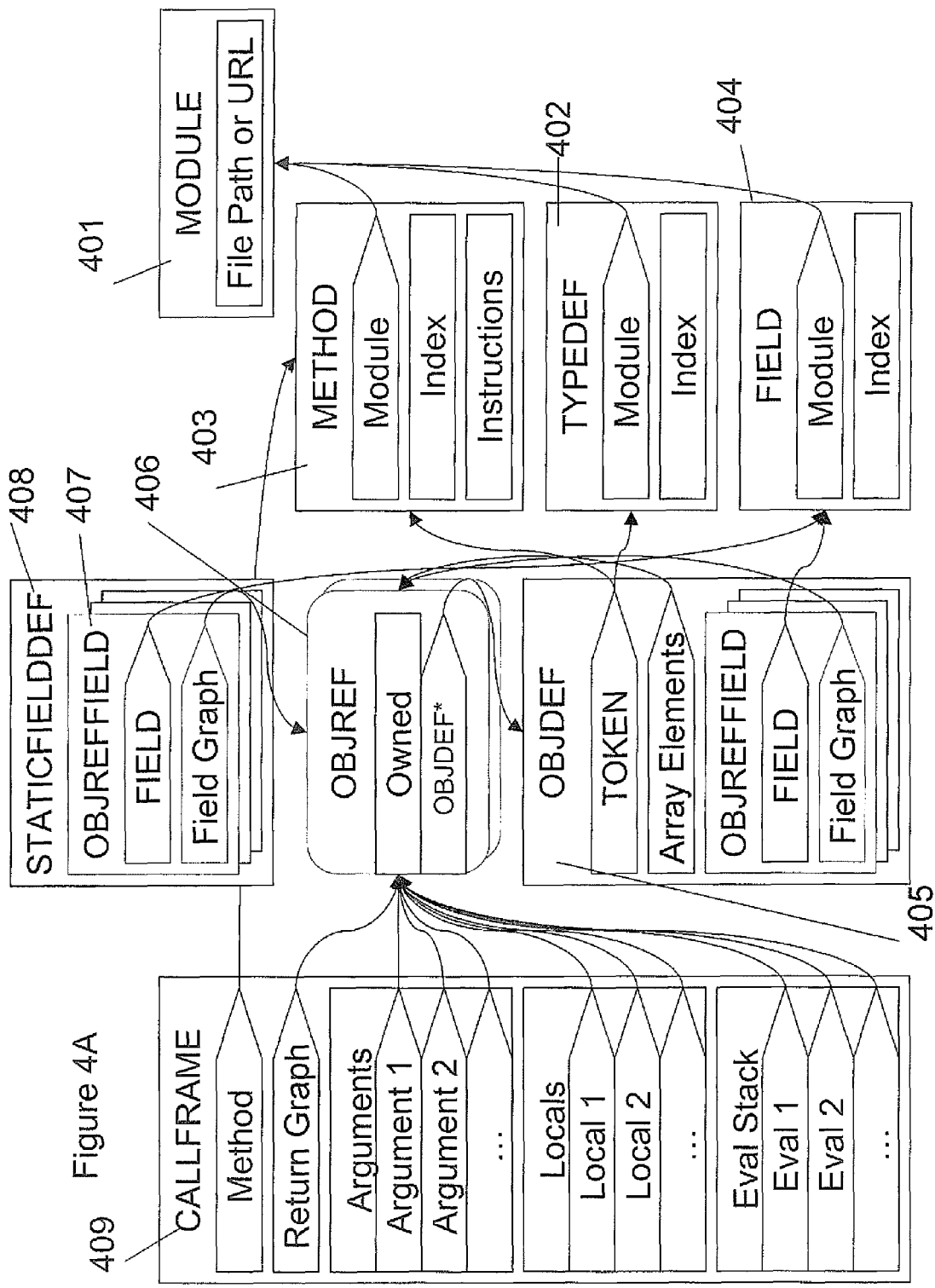
FIG. 4A is a block diagram of the various structures used for static type analysis.
Figure 4B:
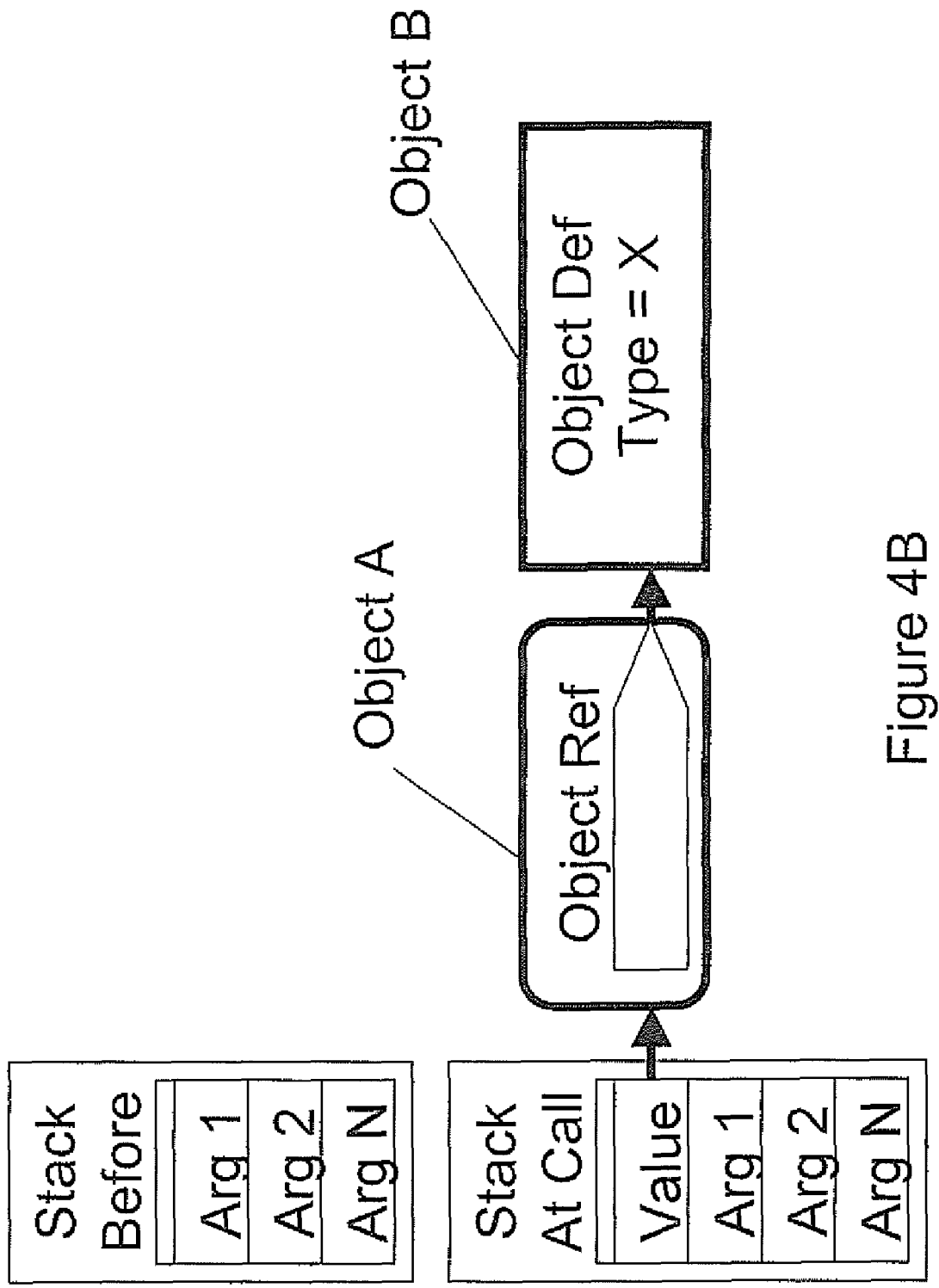
FIG. 4B illustrates partial type graph manipulation for the "New Object" instruction, according, to one aspect of the present invention.
Figure 4C:
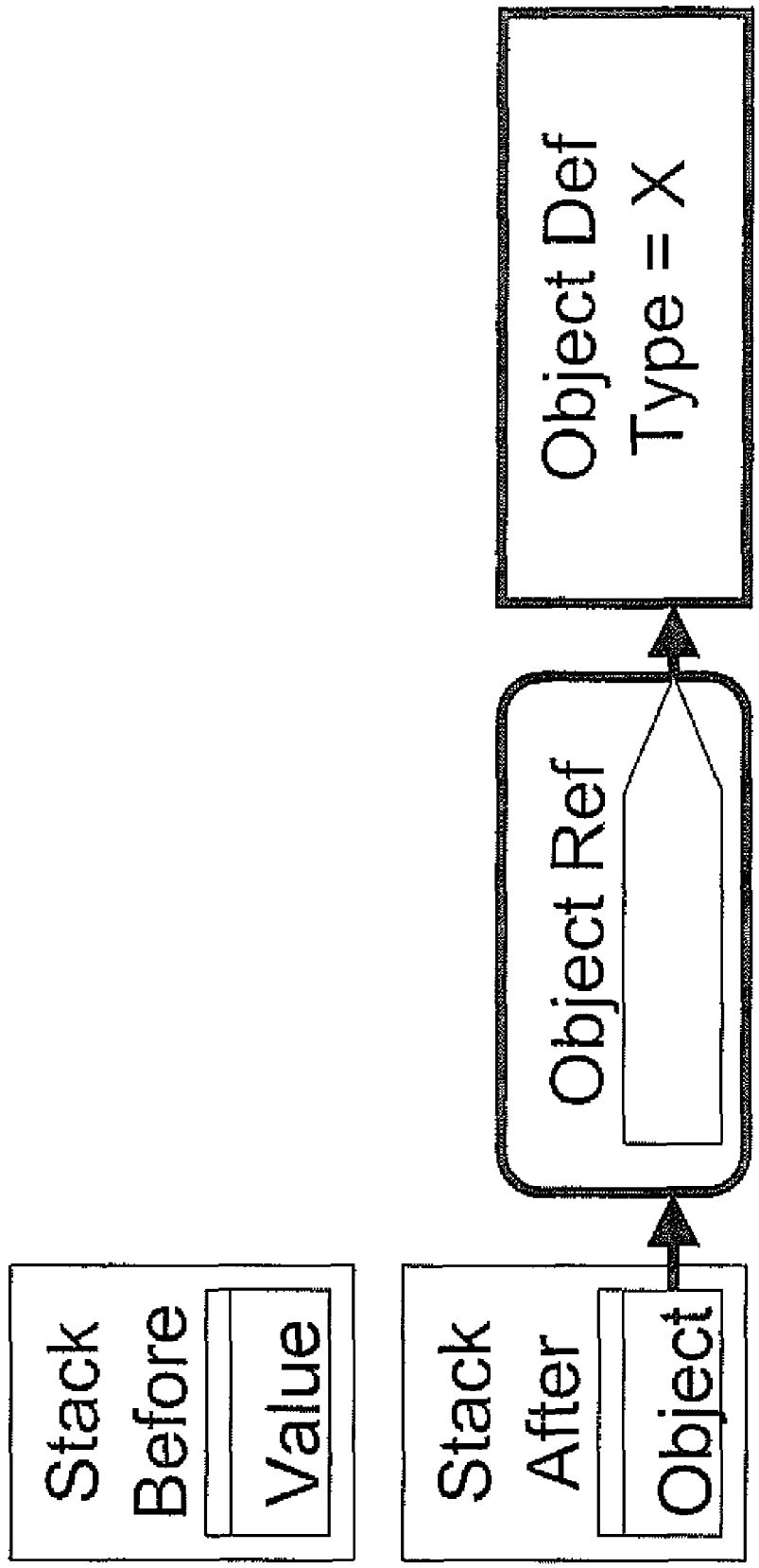
FIG. 4C illustrates type graph manipulation for the "Box" instruction family, according to one aspect of the present invention.

The present invention maintains a network of data structures that are created and manipulated by the static type analysis of step S301. FIG. 4A contains a block diagram illustrating the plural data structures. The data structures comprise the following labeled structures: MODULE 401; TYPEDEF 402; METHOD 403; FIELD 404; OBJDEF 405; OBJREF 406; OBJFIELDREF (also referred to as OBJECTREFFIELD) 407; STATICFIELDLIST 408; and CALLFRAME 409.

The MODULE 401 structure corresponds to a module (or library) of code. For the CUR implementation (i.e. for Microsoft.Net based implementation), Module 401 corresponds to Windows DLL or EXE files containing IL code, and contains a member string field which identifies the local file path or URL to the module.

The TYPEDEF 402 structure corresponds to a class type. Each type resides within a specific module and may optionally contain member functions and fields. Such member functions and defined fields are efficiently obtained separately depending on the particular MRTE and are not tracked specifically in these structures. The TYPEDEF 402 structure contains necessary information to uniquely identify the type, including a pointer to MODULE 401 where the type resides, and an index to uniquely identify the type within MODULE 401. It is noteworthy that for the CLR implementation, this index corresponds to the metadata index of the "TypeDef" table.

The FIELD 404 structure corresponds to a field within a class. The FIELD 404 structure contains necessary information to uniquely identify the field, including a pointer to MODULE 401 where the field resides, and an index to uniquely identify the field within MODULE 401. For the CLR embodiment, this index corresponds to the metadata index of the "Field" table.

The METHOD 403 structure corresponds to a function that is included in the transformed program. It contains necessary information to uniquely identify the function, including a pointer to MODULE 401 where the function resides, and an index to uniquely identify the function within MODULE 401. For the CLR implementation, this index corresponds to the metadata index of the "Method" table. A function also resides within a specific class, and defines a specific combination of parameters. However that information can be efficiently obtained separately depending on the particular MRTE and is not tracked specifically in these structures. The METHOD 403 structure also includes a pointer to the intermediate language co-de for the function, and pointer to a function header (possibly containing exception handling information) whose contents depend on the specific MRTE.

The OBJDEF 405 structure describes a possible type of value and optionally possible field types, or array elements if the type is an array. It consists of a TYPEDEF 402 pointer which uniquely identifies the type, an OBJFIELDREF 407 pointer that points to an optional linked list of OBJFIELDREF 407 structures identifying fields accessed on the object, and in the case of an array, an OBJREF 406 pointer that points to an optionally linked list of OBJREF 406 structures describing the possible types of array elements.

The OBJFIELDREF 407 structure represents a field that is accessed on a particular object (OBJDEF 405), and the possible types of objects that may be set for the field. It consists of an OBJFIELDREF 407 pointer, which points to the next field in the linked list, a FIELD 404 pointer uniquely identifying the field, and an OBJREF 405 pointer that points to a linked list of OBJREF 405 structures describing the possible types of field values.

The STATICLIST 408 structure maintains a linked list of OBJFIELDREF 407 strictures corresponding to static fields.

The OBJREF 406 structure forms a segment of a linked list that describes a set of OBJDEF 405 structures. An OBJREF 406 effectively describes a set of possible types that may exist for a particular value. It consists of an OBJREF 406 pointer that points to the next OBJREF 406 link of a linked list, and an OBJDEF 405 pointer that points to an OBJDEF 405 structure that defines a possible type.

There is a notion of hard-references and soft-references to an OBJREF 406 structure. Any reference from an evaluation stack to an OBJREF 406 is considered soft, and any other reference is a hard-reference. Only one hard-reference is permitted for an OBJREF 406. Any time a hard-reference is made to an OBJREF 406, that OBJREF 406 structure is marked as "Owned". Once set, hard references are not removed, as the nature of type constraint analysis only allows constraints to broaden and not narrow. The "Owned" mark is used to determine whether or not shortcuts may be taken during type analysis for efficiency.

When an OBJREF 406 structure is retrieved from a local variable, argument, field, or array element, the stack simply points to the same OBJREF 406 structure, and the structure will always be marked as Owned. When an OBJREF 406 structure is initially created by a "New Object", "New Array", or "Box" instruction (FIG. 4C), it is not yet marked Owned. When an OBJREF 406 structure is designated to be stored onto a local variable, argument, field, or array element, and is already owned, then a separate chain of OBJREF 406 structures is constructed that consist of links pointing to the same OBJDEF 406 structures.

When an OBJREF 406 structure is designated to be stored onto a local variable, argument, field, or array element, and is NOT owned, then OBJREF 406 is directly linked to any existing chain and marked as Owned. This behavior preserves strict type constraints at the local scope while manipulating structures very efficiently.

The CALLFRAME 409 structure corresponds to a particular call to a specific function. It consists of a METHOD 403 pointer designating the method, and several arrays of OBJREF 406 pointers. The set of possible types passed in as arguments to the function are contained in an array of OBJREF 406 pointers where each array element points to a linked list for each parameter. The set of possible types set as local variables are contained in an array of OBJREF 406 pointers where each array element points to a linked list for each local variable. The set of possible types that may exist on the evaluation stack are contained in an array of OBJREF 406 pointers where each array element points to a linked list for each stack location. The sizes of each of these arrays are determined by the associated METHOD 403.

It is noteworthy that the foregoing illustration and description of data structures is not intended to limit the present invention. Other layouts may be used in practice depending on the specific MRTE, class libraries used for implementation of the process, and other information that may be tracked. This specific layout of C structures described above is for clarity only.

All programs have a single entry point, commonly labeled as the "Main" function. To prepare for analysis, a MODULE 401 structure is allocated and initialized that corresponds to the executable (EXE) file, and a METHOD 403 structure is allocated and initialized to represent the Main function.

Once the foregoing structures are initialized, the analysis proceeds by iterating through each intermediate level (IL) instruction. Based on the specific IL instruction, these structures are manipulated in a specific way.

Based on the interpretation/analysis, in step S302, the process builds a call graph. The present invention determines function dependencies by creating the call graph and locally scoped value graphs. A call graph is a data representation of which functions call other functions, and functions called by those functions, recursively. A value graph is a data representation of possible types of values that may exist in a running system. The value graph of the present invention is Slow-sensitive; that is, it defines possible types of values that may exist at a particular instruction following, a particular call path.

For the purposes of the present invention, a call path is defined as a unique path of program execution at the inter-function level. For example, a unique call path could be defined as Function Main, Instruction 6 calling into Function B, and Function B, Instruction 14 calling into Function G, etc. Such call paths do not define execution behavior within a function such as loops or "if" statements etc., since such an attempt would require predicting actual values in advance, which is not possible with programs that depend on external interaction. However, determining value types in advance (not actual values) is sufficient for eliminating most unused virtual functions.

Instructions that place values onto a stack copy the exact type constraint chain onto the associated value graph (step S302). Instructions that store values from the stack merge the type constraints with any existing type constraints, creating a union of type constraints on the associated value graph (step S302).

Some instructions deal specifically with object types, while others work with a variety of types. For cases where a type is not an object, type graphing is simply omitted.

The following describes type graph manipulation for plural instructions, according to one aspect of the present invention:

"New Object" Instruction (FIG. 4B): This creates an OBJDEF 405 structure A pointing to the associated TYPEDEF 402 as specified by the instruction, creates an OBJREF 406 structure B pointing to A, and inserts B on the stack preceding any parameters passed to the constructor (shifting any such parameters upward). It then follows the same procedure of the "Call" instruction [FIG. 19], described later.

Figure 5:
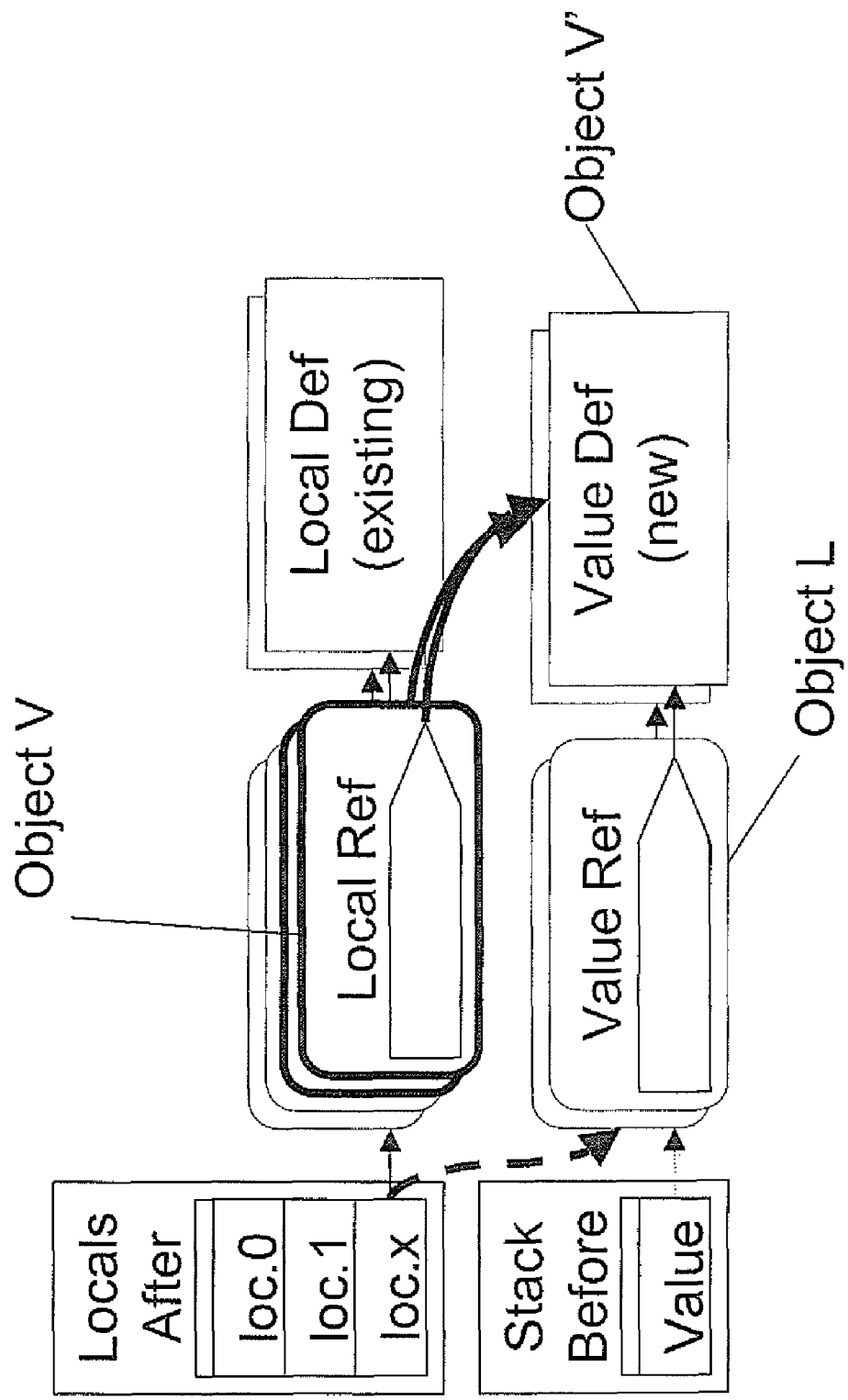
FIG. 5 illustrates type graph manipulation for the "Store Local Variable" instruction family, according to one aspect of the present invention.

"Store Local Variable" Instruction [FIG. 5]. This causes a corresponding local variable type graph to point to the OBJREF 406 V located at the top of the stack type graph, if it is not Owned. If V is Owned, then an OBJREF 406 L is created for each segment of the linked list of V, of which each V segment points to OBJDEF 405 structure V'. Each L structure points to the respective V' OBJDEF 405 structure. The chain of L OBJREF 406 structures is appended to the existing chain.

Figure 6:
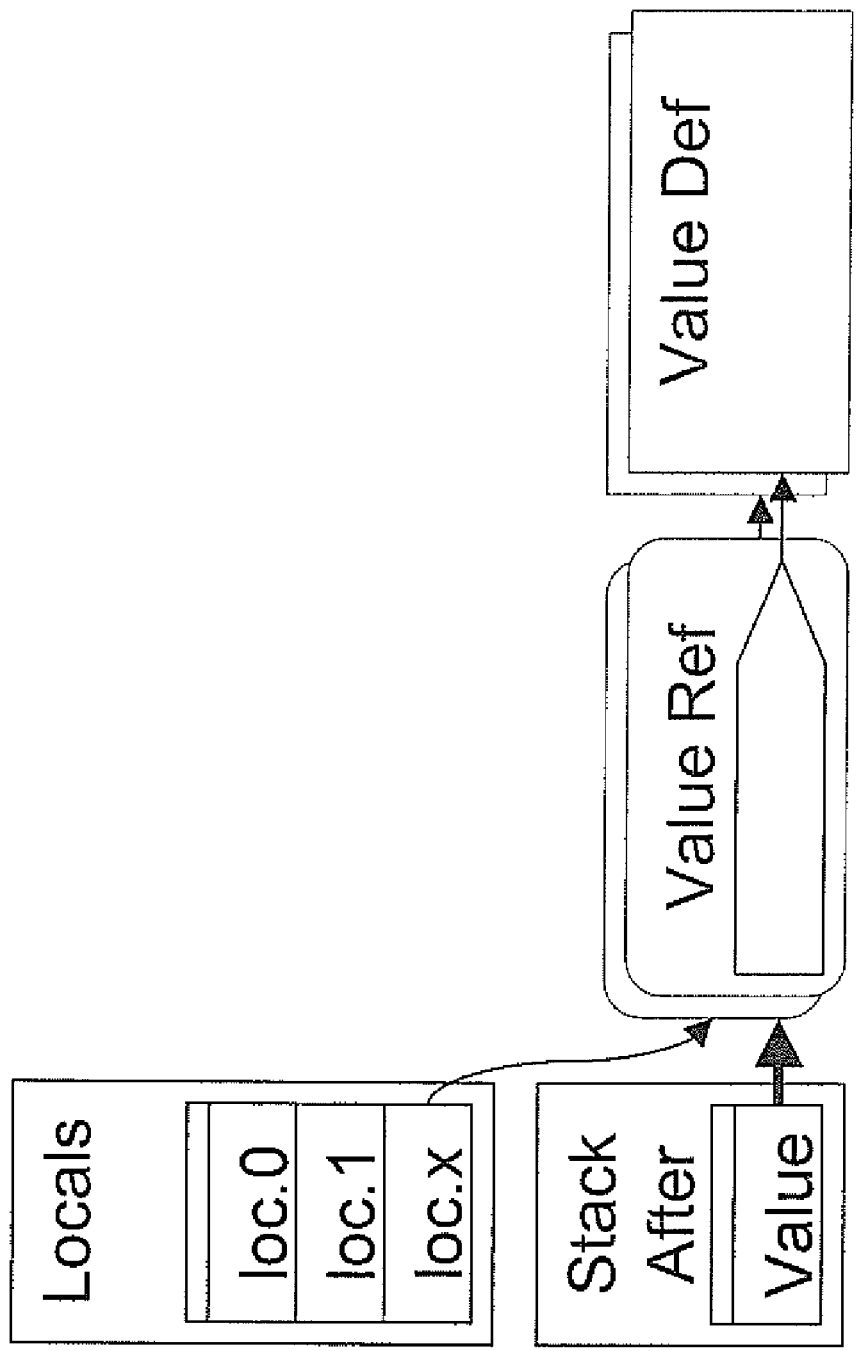
FIG. 6 illustrates type graph manipulation for the "Load Local Variable" instruction, according to one aspect of the present invention.

"Load Local Variable" Instruction [FIG. 6]: This causes the top of the stack type graph to point to the OBJREF 406 located at the corresponding local variable type graph, if defined. The "Load Local Variable Address" instruction uses the same procedure as the "Load Local Variable" function. Although the instruction designates an address, it is not critical for type analysis, as the type is guaranteed to be converted to an object reference when it is used later. Thus, types and addresses of types are treated the same for the purposes of type constraint analysis.

Figure 7:
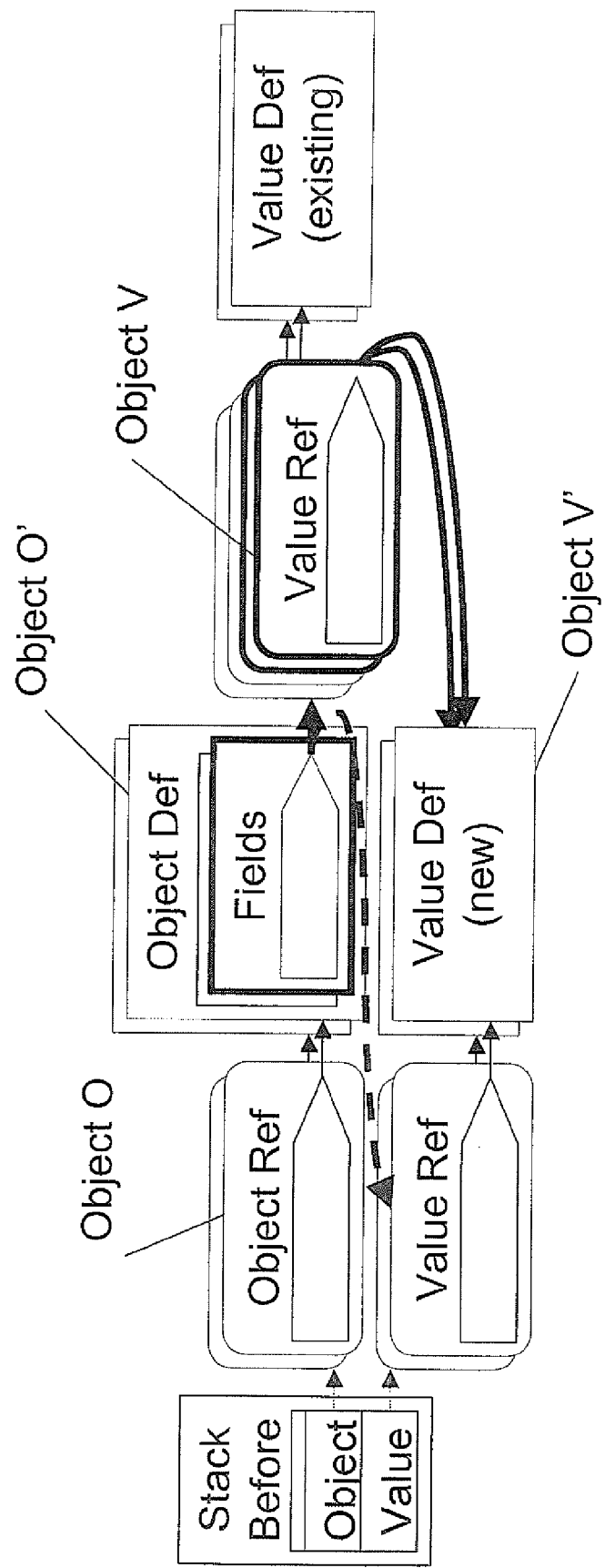
FIG. 7 illustrates type graph manipulation for the "Store Object Field" instruction, according to one aspect of the present invention.

The "Store Field" Instruction [See FIG. 7] locates OBJREF 406 structure "O" at the second-to-the end slot of the stack type graph, which corresponds to the object whose field is to be set, and iterates through the linked list of OBJREF 406 structures. For each OBJREF 406 structure O, the associated OBJDEF 405 structure O' is located on "O", the linked list of OBJFIELDREF 407 structure is enumerated to locate a corresponding OBJFIELDREF 407 F, whose FIELD 404 matches that specified by the instruction. IF no associated OBJFIELDREF 407 exists, then a new OBJFIELDREF 407 F is allocated, initialized to the specified FIELD 404, and added to the linked list of O'. The instruction then locates OBJREF 406 structure V at the end slot of the stack graph, which corresponds to the value in which to set the field. If V is not owned, then V is added to the end of the linked list of F. If V is owned, then the contents of V are merged with the contents of F. Specifically, for each OBJREF 406 structure V, the associated OBJDEF 405 structure V' is located, and if V' differs from existing field type E, then a new OBJREF structure N is added to linked-list of F, pointing to V.

Figure 8:
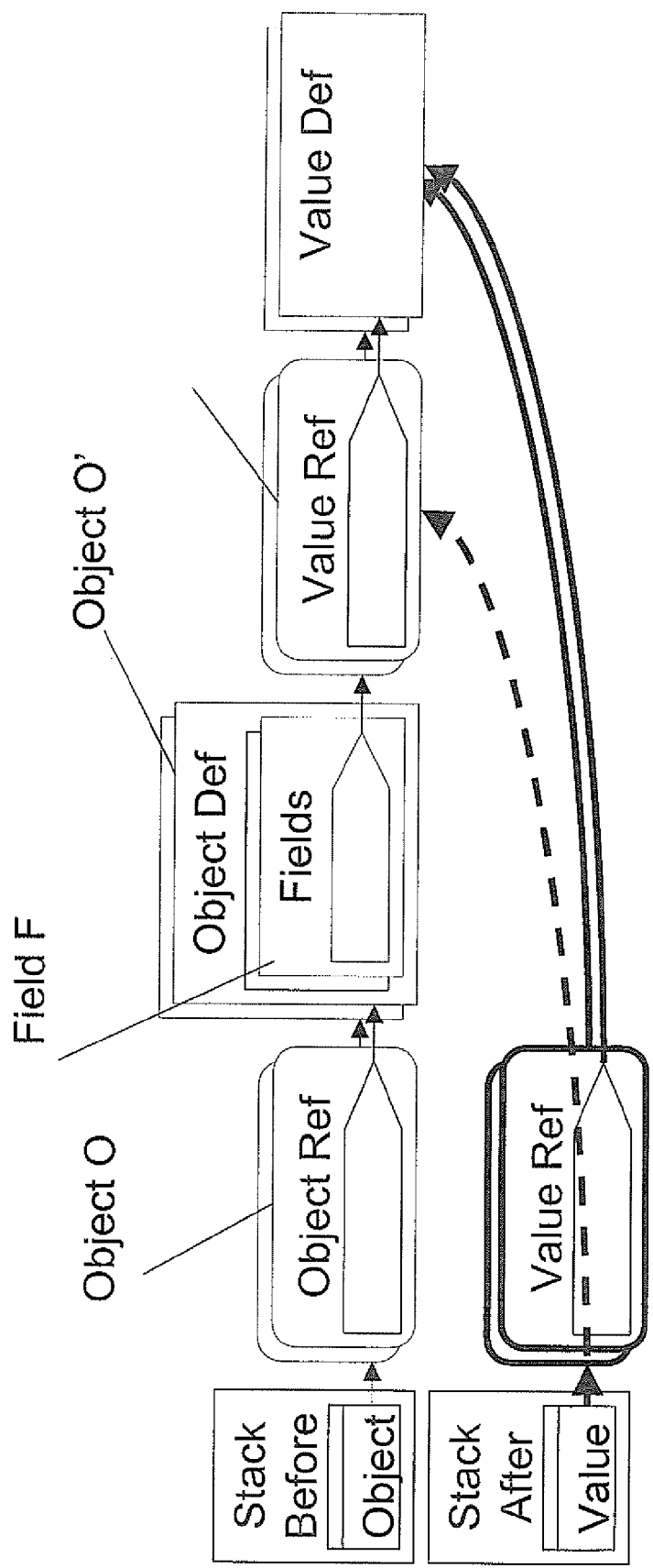
FIG. 8 illustrates type graph manipulation for the "Load Object Field" instruction, according to one aspect of the present invention.

"Load Field" instruction [FIG. 8] locates OBJREF 406 structure O at the end of the stack type graph, which corresponds to the object(s) whose field is to be retrieved, and iterates through the linked list of OBJREF 406 structures. For each OBJREF 406 structure O, the associated OBJDEF 405 structure O' is located. On each O', the OBJFIELDREF 407 structure F is located. If there is a single instance of O, then the end of the stack points directly to the linked list of F. Otherwise, a new OBJREF 406 V structure is allocated for each element within the linked list of F, for each OBJREF 406 O. The end of the stack then points to the chain of V structures.

"Load Field Address" instruction uses the same procedure as the "Load Field" instruction. In the same manner as the "Load Local Variable Address" instruction, the fact that the instruction designates an address is inconsequential for type analysis, as the type is guaranteed to be converted to an object reference when it IS used later.

Figure 9:
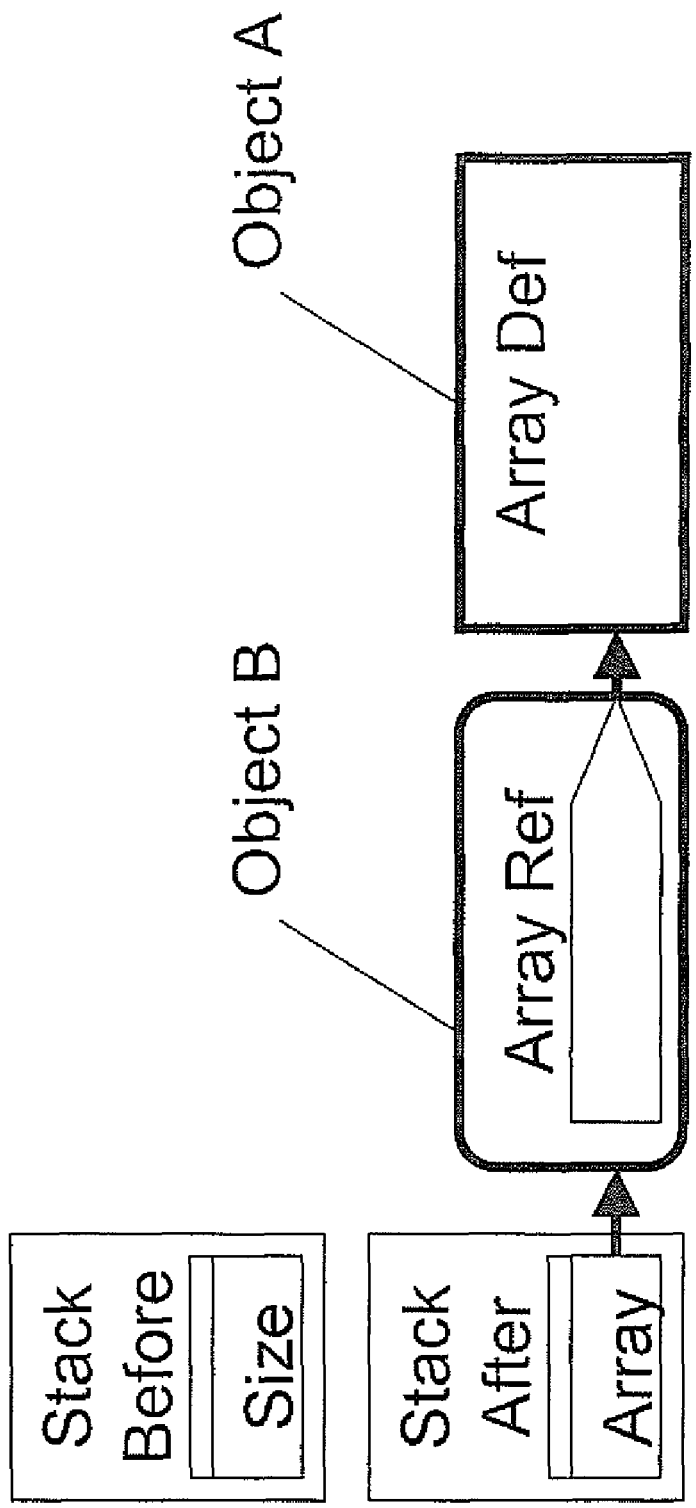
FIG. 9 illustrates type graph manipulation for the "New Array" instruction, according to one aspect of the present invention.

"New Array" instruction [FIG. 9] creates an OBJDEF 405 structure A pointing to the associated TYPEDEF 402 as specified by the instruction, creates an OBJREF 405 structure B pointing to A, and sets the top of the stack type graph to B.

Figure 10:
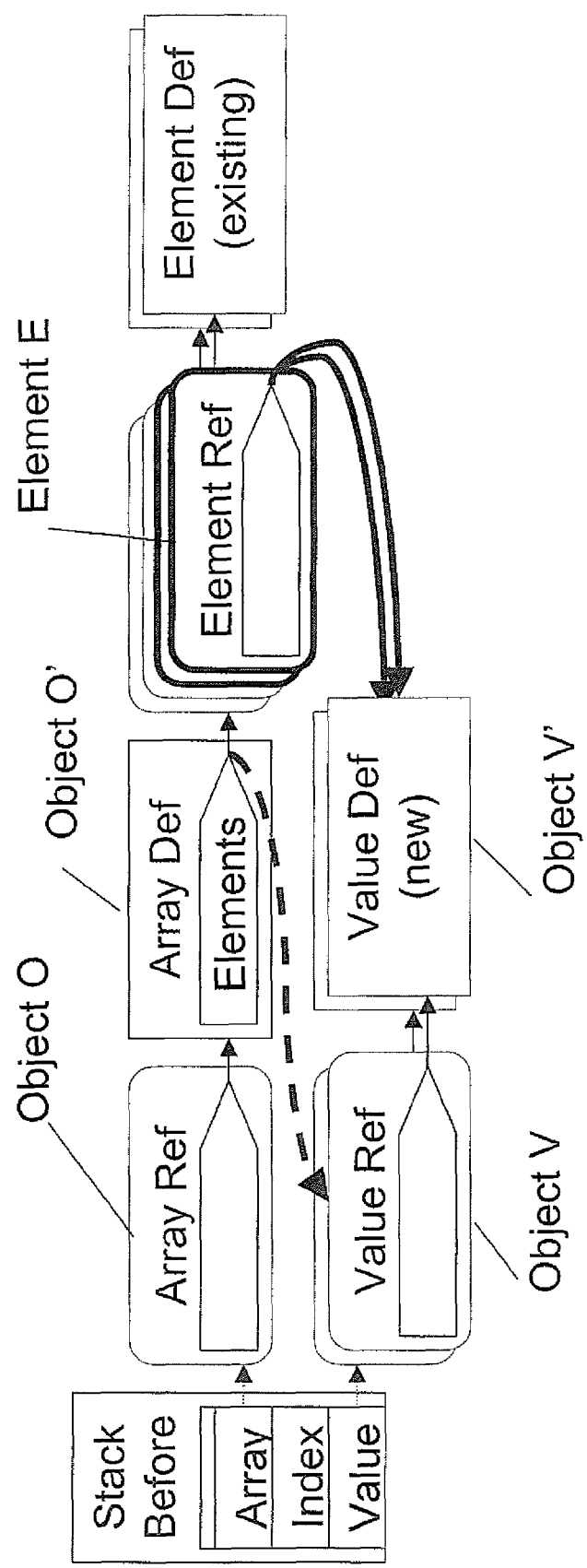
FIG. 10 illustrates type graph manipulation for the "Store Array Element" instruction, according to one aspect of the present invention.

"Store Array Element" instruction [FIG. 10] locates OBJREF 406 structure O at the third-to-the end slot of the stack type graph, which corresponds to the object whose array element is to be set, and iterates through the linked list of OBJREF 406 structures. For each OBJREF 406 structure O, the associated OBJDEF 405 structure O' is located. The instruction then locates OBJREF 406 structure V at the end slot of the stack graph, which corresponds to the value in which to set the array element. If V is not owned, and the OBJREF 406 linked list O contains only one segment, then V is added to the end of the linked list of F. Otherwise, the contents of V are merged with the linked list of O. Specifically, for each OBJREF 406 structure V, the associated OBJDEF 405 structure V' is located, and if V' differs from existing array elements E, then a new OBJREF 406 structure N is added to linked-list of array elements of O', pointing to V.

Figure 11:
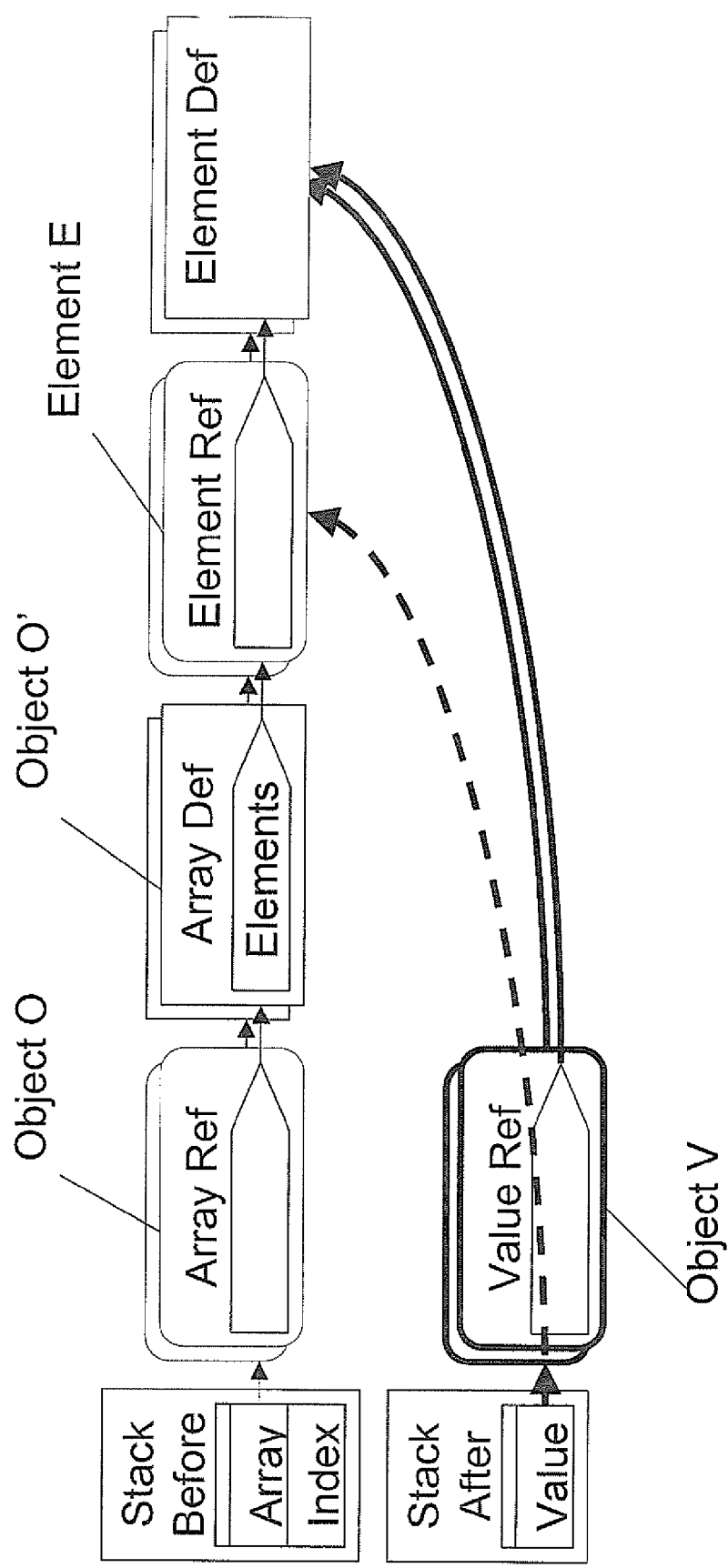
FIG. 11 illustrates type graph manipulation for the "Load Array Element" instruction, according to one aspect of the present invention.

"Load Array Element" instruction [FIG. 11] locates OBJREF 406 structure O at the end of the stack type graph, which corresponds to the arrays(s) whose element is to be retrieved, and iterates through the linked list of OBJREF 406 structures. For each OBJREF 406 structure O, the associated OBJDEF 405 structure O' is located. If there is a single instance of O, then the end of the stack points directly to the linked list of array elements O'; otherwise, a new OBJREF 406 V structure is allocated for each element within the linked list of O', for each OBJREF 406 O. The end of the stack then points to the chain of V structures.

Figure 12:
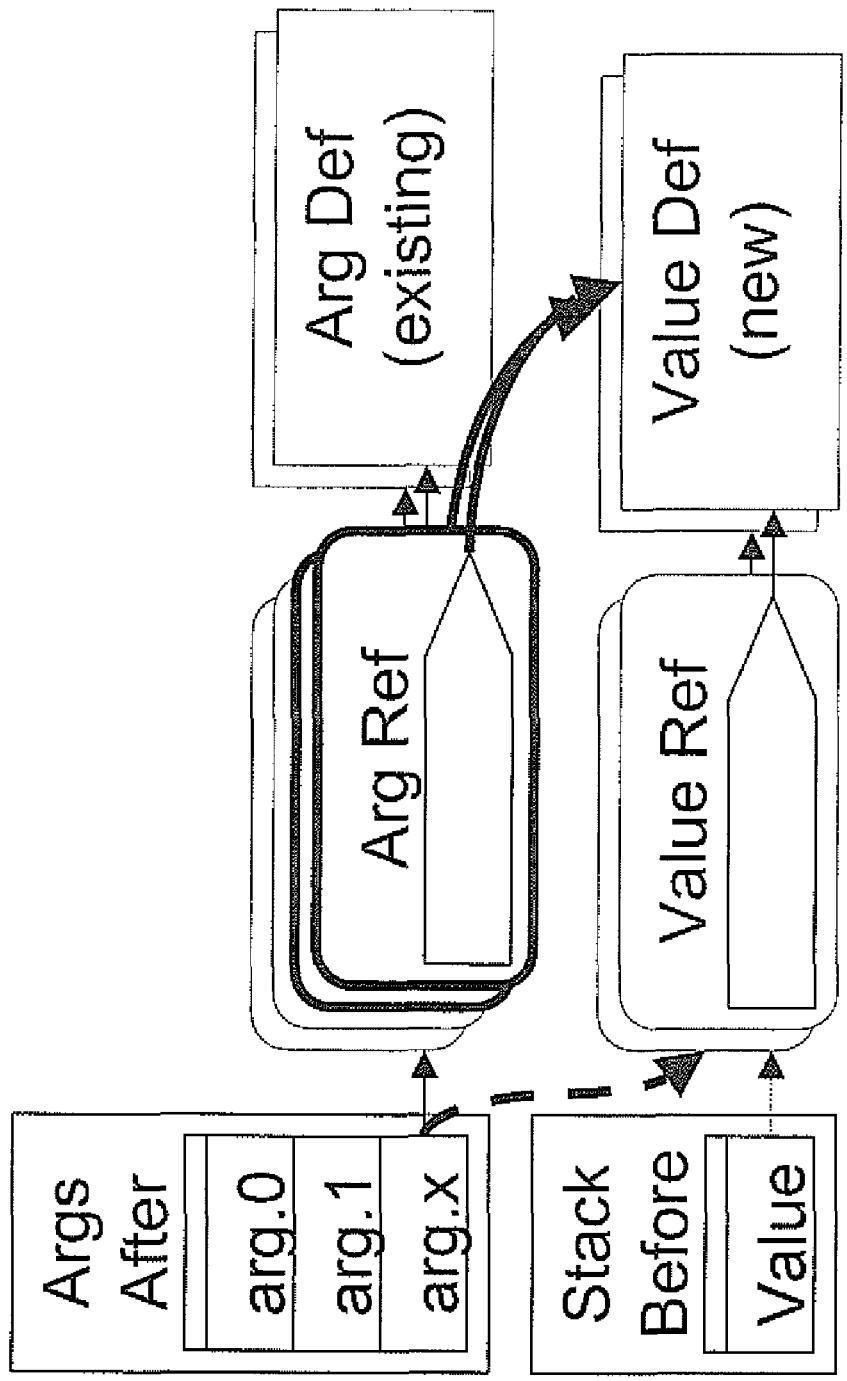
FIG. 12 illustrates type graph manipulation for the "Store Argument" instruction, according to one aspect of the present invention.

"Store Argument" instruction [FIG. 12] operates the same way as the "Store Local Variable" instruction, the exception being that the argument linked-list is used in place of the local variable linked-list.

Figure 13:
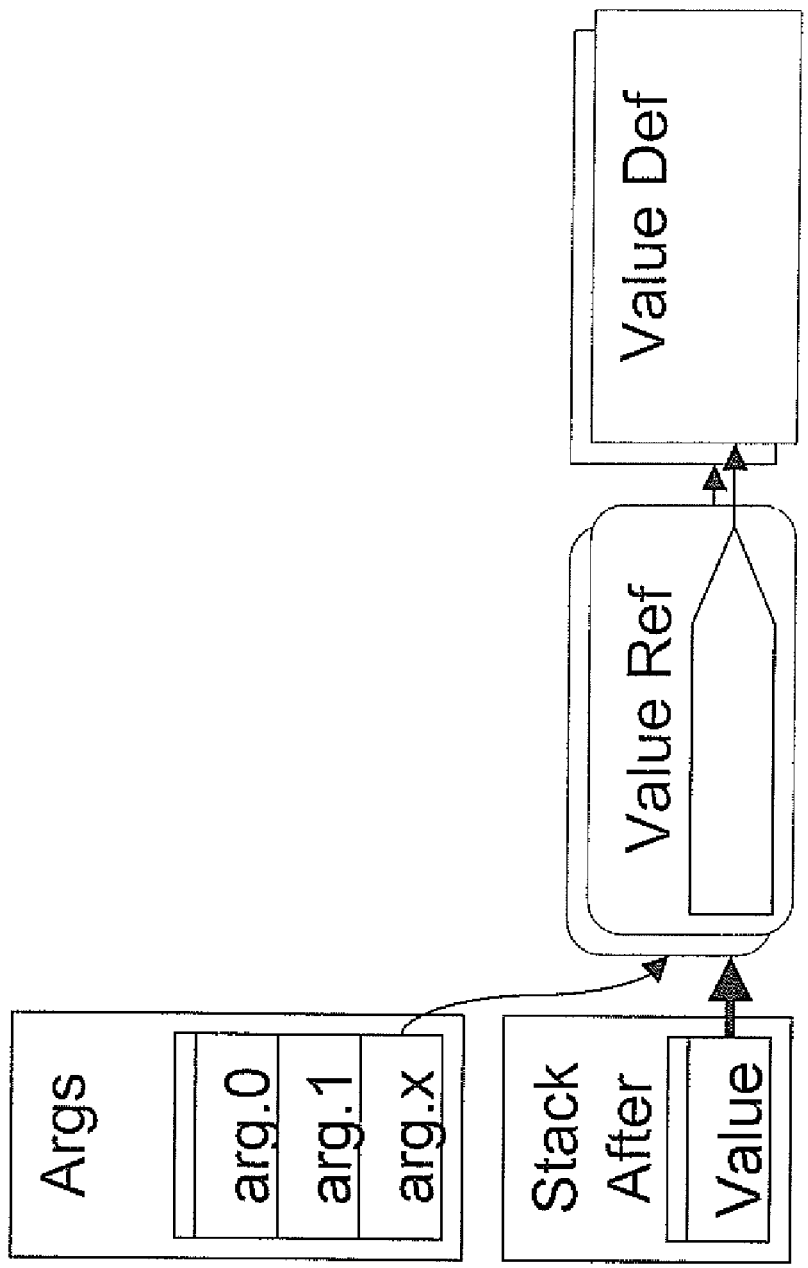
FIG. 13 illustrates type graph manipulation for the "Load Argument" instruction, according to one aspect of the present invention.

"Load Argument" and "Load Argument Address" instructions [FIG. 13] operate the same way as the "Load Local Variable" instruction, except that the argument linked-list is used in place of the local variable linked-list.

Figure 14:
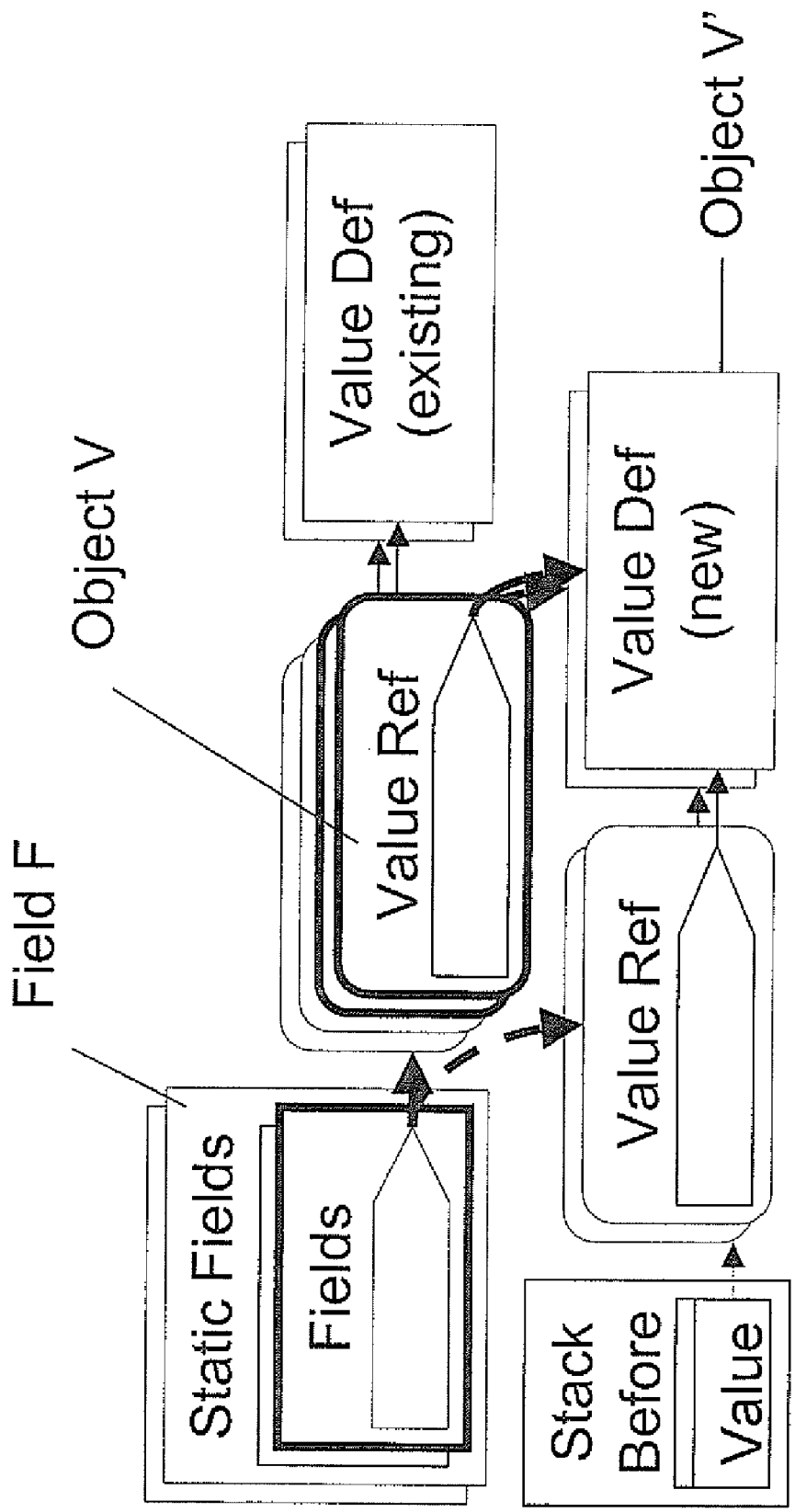
FIG. 14 illustrates type graph manipulation for the "Store Static Field" instruction, according to one aspect of the present invention.

"Store Static Field" instruction [FIG. 14] locates the global linked list of static field type graphs located on the STATICLIST 408 structure. The OBJFIELDREF 407 linked list is enumerated to locate a corresponding OBJFIELDREF 407 F, whose FIELD 404 matches that specified by the instruction. If no associated OBJFIELDREF 407 yet exists, then a new OBJFIELDREF 407 F is allocated, initialized to the specified FIELD 404, and added to the linked list of static fields. The instruction then locates OBJREF 406 structure V at the end slot of the stack graph, which corresponds to the value in which to set the field. If V is not owned, then V is added to the end of the linked list of F. Otherwise, if V is owned, then the contents of V are merged with the contents of F. Specifically, for each OBJREF 406 structure V, the associated OBJDEF 405 structure V' is located, and if V' differs from existing field types E, then a new OBJREF 406 structure N is added to linked-list of F, pointing to V.

Figure 15:
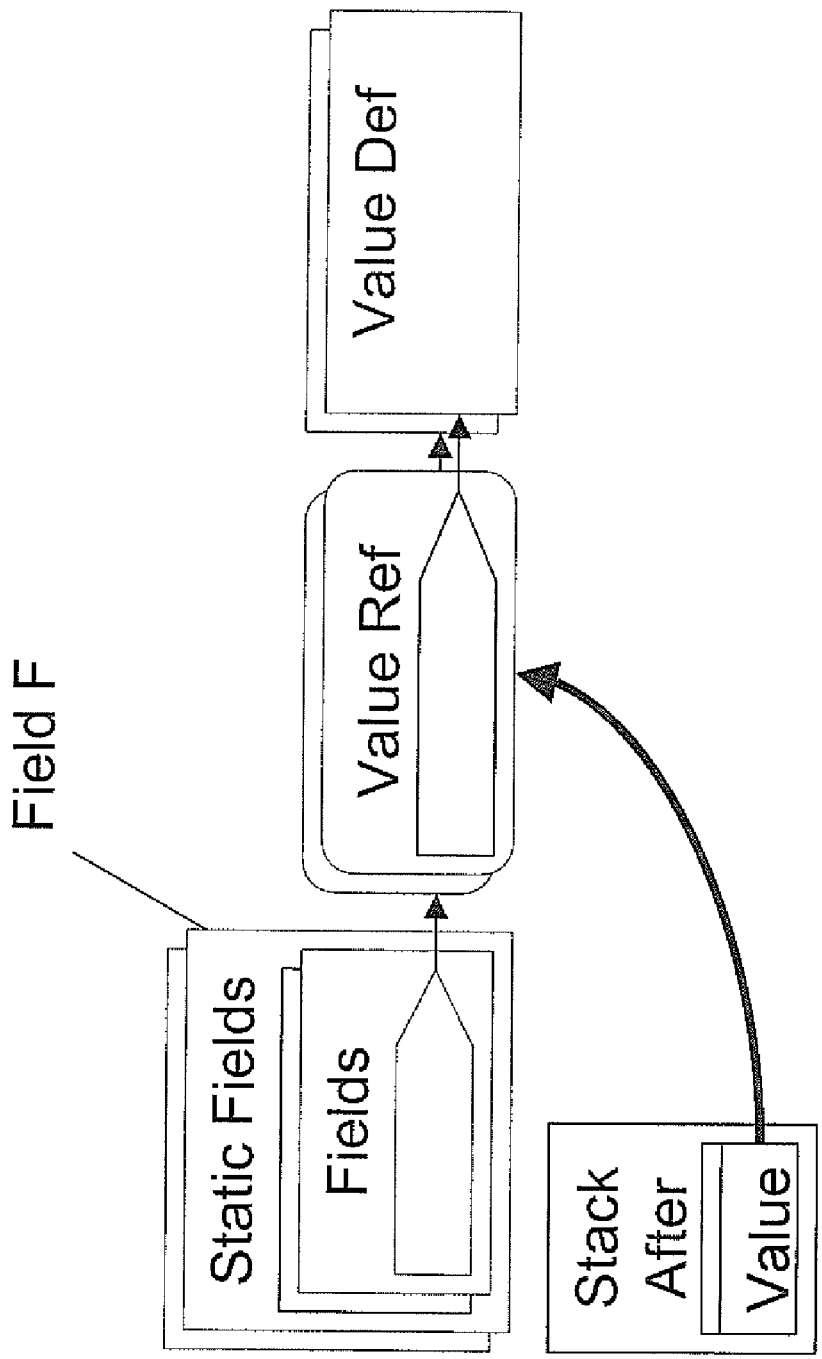
FIG. 15 illustrates type graph manipulation for the "Load Static Field" instruction, according to one aspect of the present invention.

The "Load Static Field" instruction [FIG. 15] locates the global linked list of static field type graphs located on the STATICLIST 408 structure. The OBJFIELDREF 407 linked list is enumerated to locate a corresponding OBJFIELDREF 407 F, whose FIELD 404 matches that specified by the instruction. If no associated OBJFIELDREF 407 yet exists, then a new OBJFIELDREF 407 F is allocated, initialized to the specified FIELD 404, and added to the linked list of static fields. The presence of this instruction requires the static class constructor to be included in the list of methods. If a static class constructor is available, the static class constructor is added to the METHOD 403 linked-list of required methods and is analyzed before proceeding further with the current function analysis. After analyzing any associated static class constructor, the end of the stack then points to the linked-list of OBJREF 405 structures pointed to by F.

Figure 16:
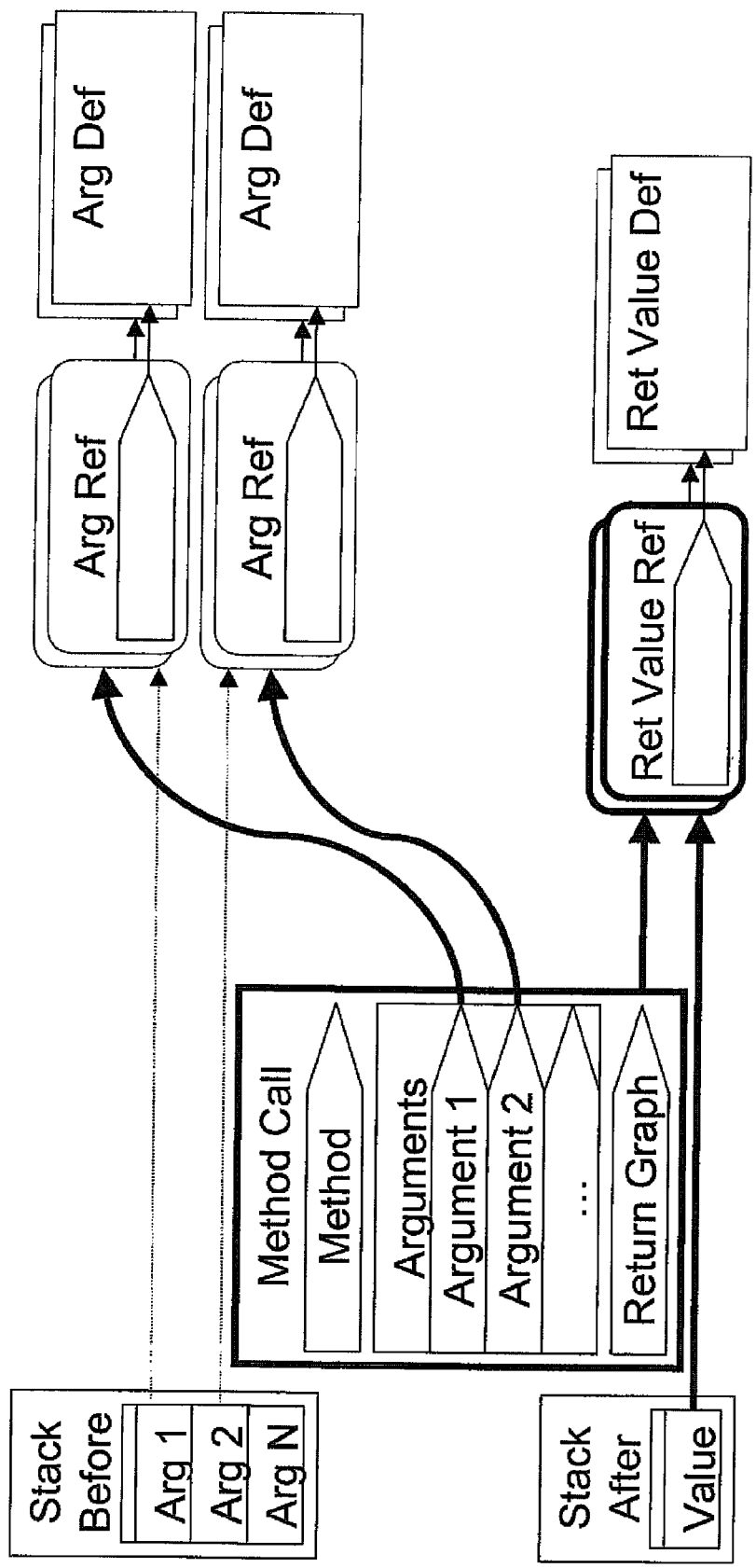
FIG. 16 illustrates type graph manipulation for the "Call" instruction, according to one aspect of the present invention.

The "Call" instruction [FIG. 16] creates a new CALLFRAME 409 structure and assigns argument pointers to the OBJREF 405 structures on the stack corresponding to the function parameters. It then proceeds to analyze the specified function. After the function is analyzed, then the end of the stack points to the linked-list of return values of the CALLFRAME 409 structure. The "New" instruction uses the same procedure for calling a constructor.

Figure 17:
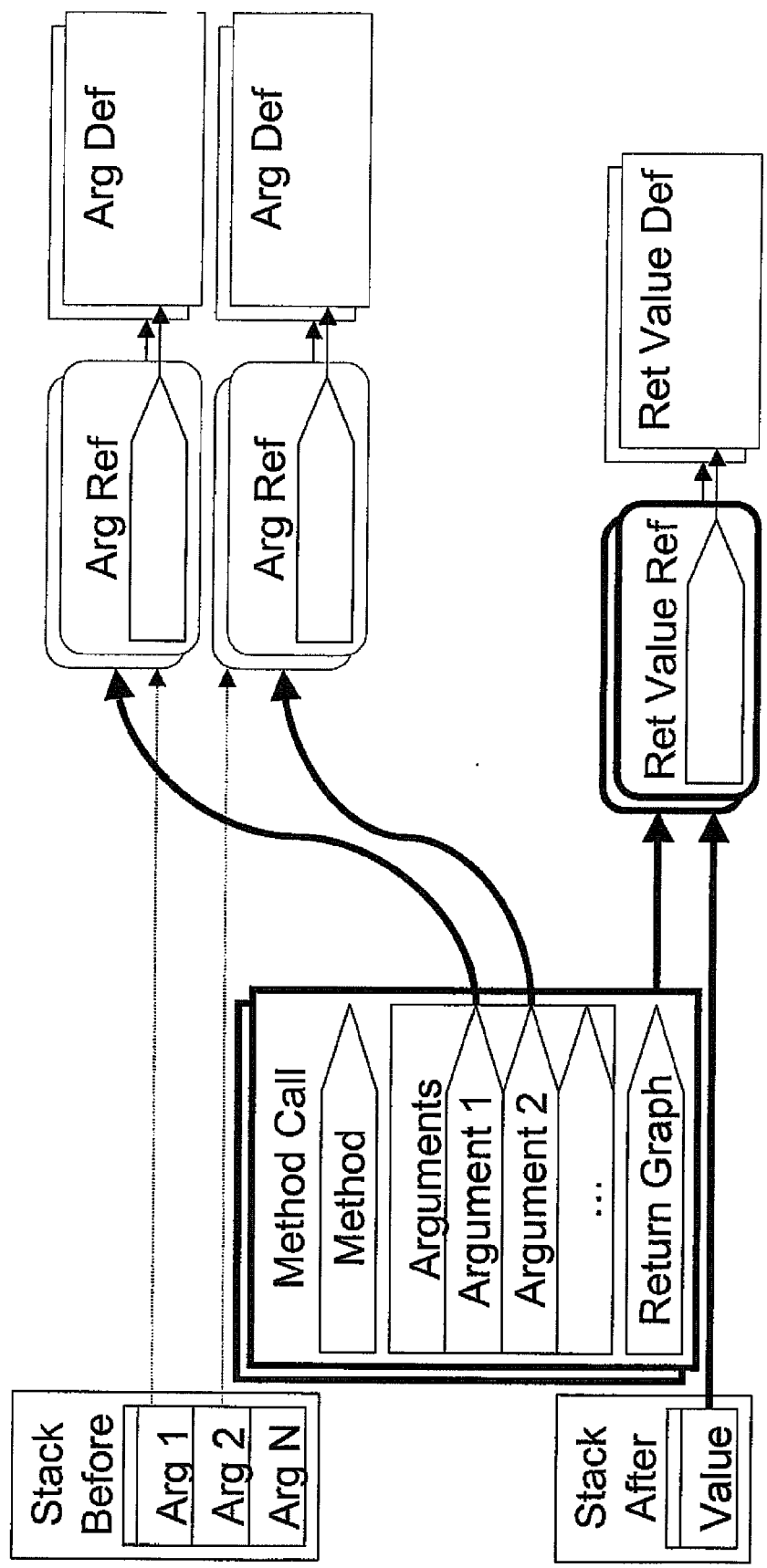
FIG. 17 illustrates type graph manipulation for the "Call Virtual" instruction, according to one aspect of the present invention.

The "Call Virtual" instruction [FIG. 17] works similarly to the "Call" instruction except that the target function depends on the constrained types of the "this" pointer which is the first argument. A mapping is done for each OBJREF 405 within the linked-list for "this" pointer, to determine the target function. If there is only a single resulting method, then the function works the same as the "Call" instruction and a direct call is made. If there are multiple possible target methods, then optimized code is inserted in-place to resolve the virtual function. Each possible target function is then analyzed. After all target functions have been analyzed, then the end of the stack points to a merged linked-list of possible return values.

Figure 18:
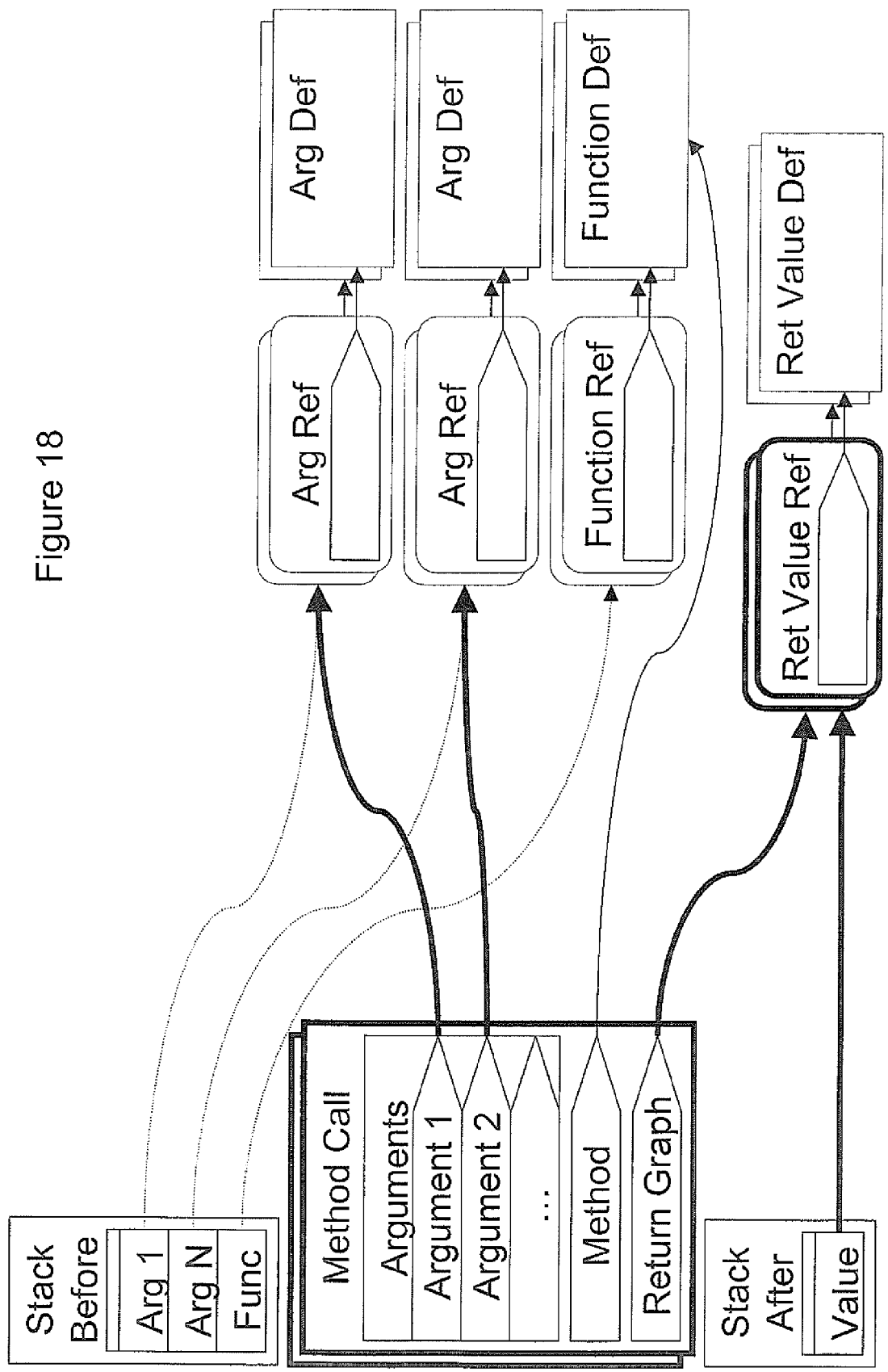
FIG. 18 illustrates type graph manipulation for the "Call Indirect" instruction, according to one aspect of the present invention.

The "Call Indirect" instruction [FIG. 18] works similarly to the "Call" instruction, except that the end of the stack specifies the target function. If there is only a single target function, then the function works the same as the "Call" instruction and a direct call is made. If there are multiple possible target methods, then optimized code is inserted in-place to resolve the function. Each possible target function is then analyzed. After all target functions have been analyzed, then the end of the stack points to a merged linked-list of possible return values.

Figure 19:
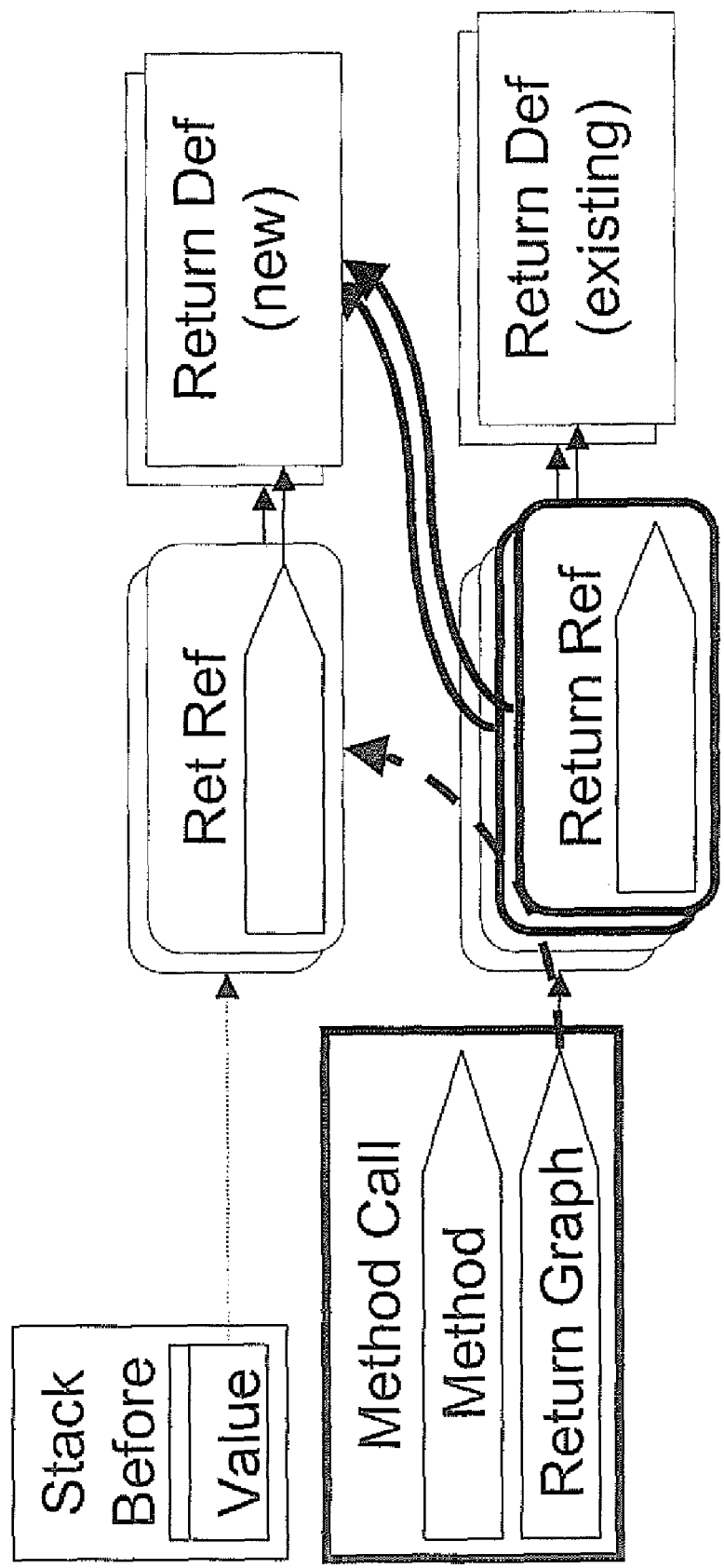
FIG. 19 illustrates type graph manipulation for the "Return" instruction, according to one aspect of the present invention.

The "Return" instruction [FIG. 19] is analyzed if the enclosing method returns an object type, where the object at the end of the stack is returned. If the OBJREF 406 structure at the end of the stack is not owned, then it is directly linked by the return type graph. If the OBJREF 406 structure at the end of the stack is owned, then each OBJREF 406 segment of the linked list is copied to a new OBJREF 406 segment, R, where each R points to the respective OBJDEF 405 structure. This new linked list R is then appended to the return type graph.

Figure 20:
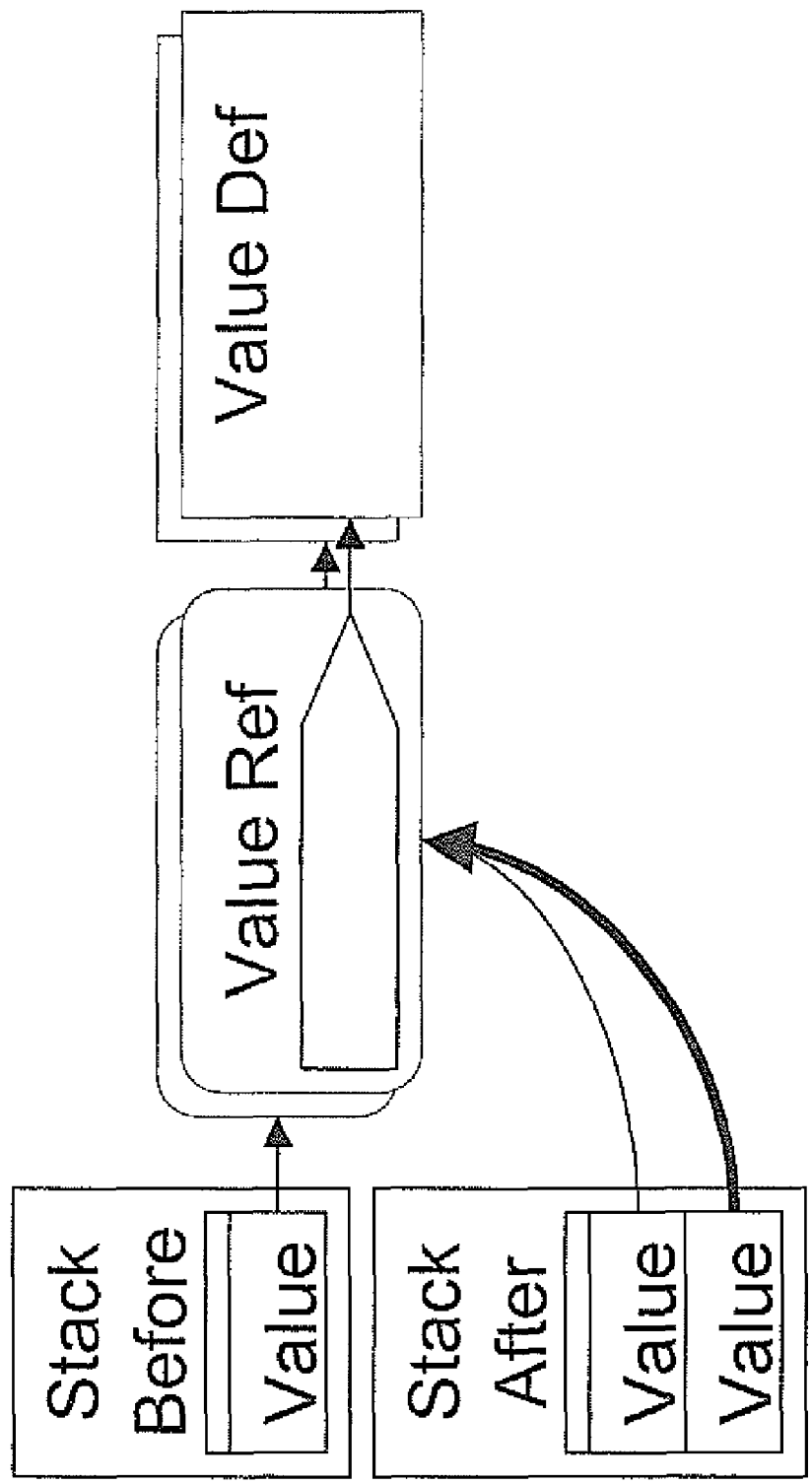
FIG. 20 illustrates type graph manipulation for the "Duplicate" instruction, according to one aspect of the present invention.

The "Duplicate" instruction [FIG. 20] is analyzed if the type at the end of the stack is an object. In such case, an additional link is made to the OBJREF by extending the stack.

Figure 21:
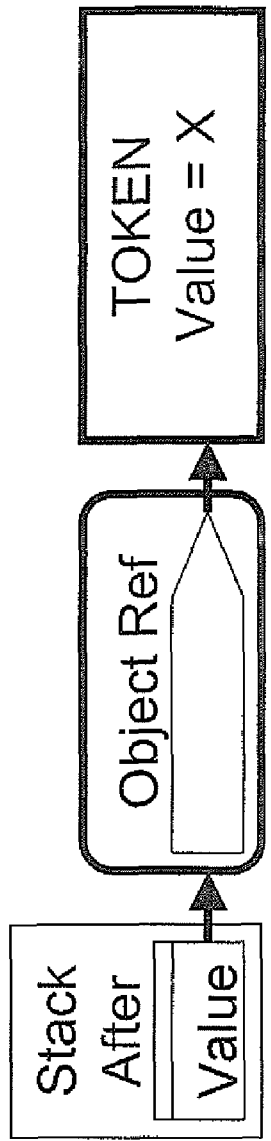
FIG. 21 illustrates type graph manipulation for the "Load Token" instruction, according to one aspect of the present invention.

The "Load Token" instruction [FIG. 21] creates an OBJREF 406 structure A, which points to an OBJDEF 405 structure B, which includes the specified metadata token. The end of the stack then points to A.

Figure 22:
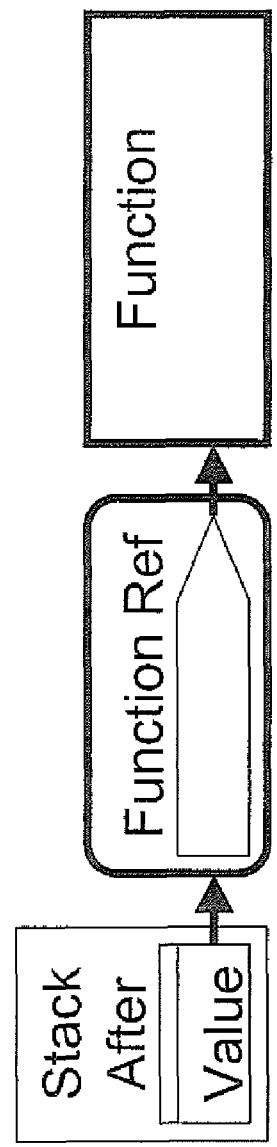
FIG. 22 illustrates type graph manipulation for the "Load Function" instruction, according to one aspect of the present invention.

The "Load Function" instruction [FIG. 22] creates an OBJREF 406 structure A, which points to a METHOD 403 structure that is created or retrieved based on the specified token. The end of the stack then points to A.

Figure 23:
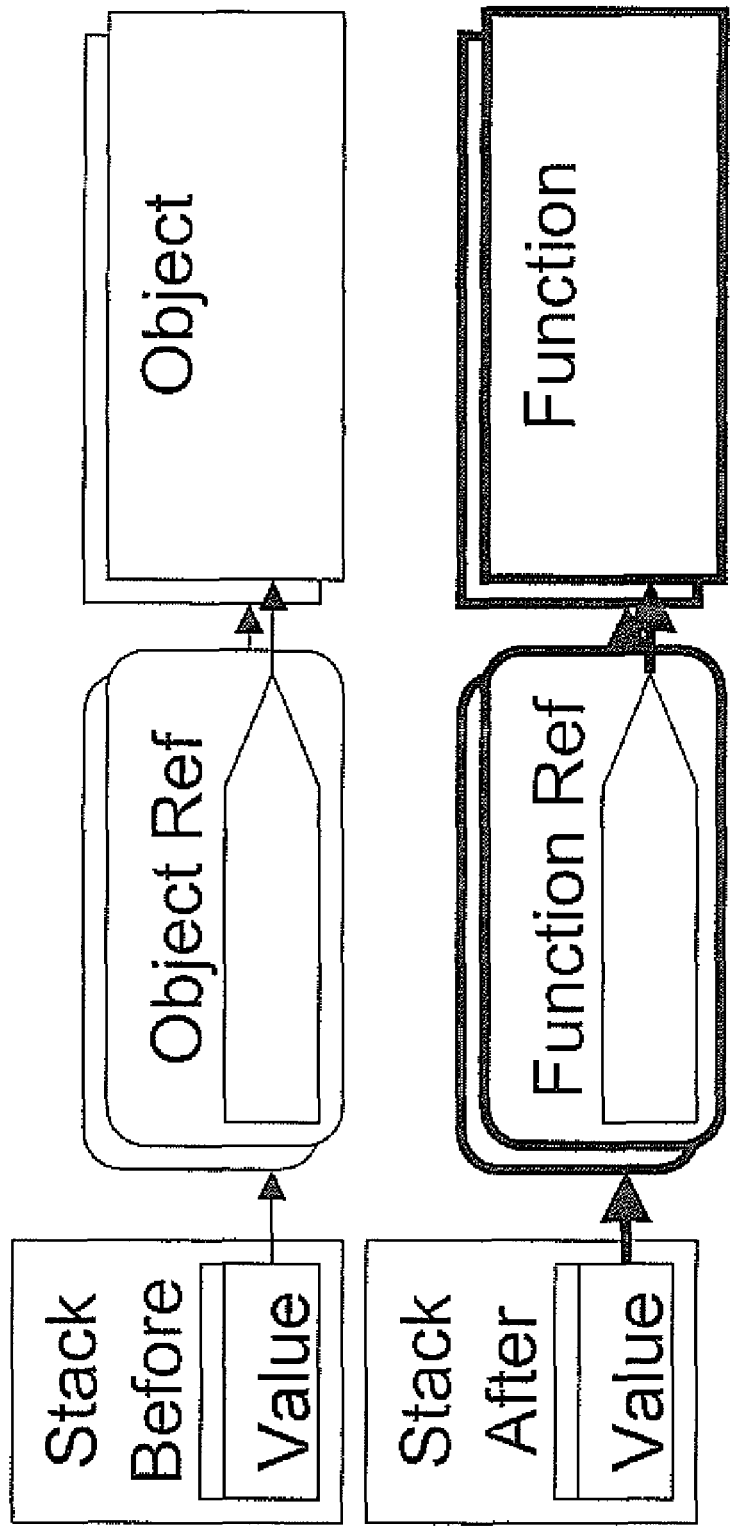
FIG. 23 illustrates type graph manipulation for the "Load Virtual Function" instruction, according to one aspect of the present invention.

The "Load Virtual Function" instruction [FIG. 23] works the same way as the "Load Function" instruction, except the OBJREF 406 linked list at the top of the stack is used to build a list of possible METHOD 403 structures. If there is only a single METHOD 403 structure, then it works the same as the "Load Function" instruction. Otherwise, code is inserted to resolve the virtual function at runtime based on the type of object, and an OBJREF F is created for each possible function, and the end of the stack points to the linked list F.

The foregoing type constraint analysis applies to functions that use intermediate language, but does not apply to functions that are implemented in machine code, otherwise known as "native functions". As most MRTE implementations use some native functions, usually for hardware-dependent functionality and runtime type information, this type constraint analysis interoperate with native functions as well.

In step S303, the process compiles the function(s) into an executable program.

In one aspect of the present invention, processor-specific code is not analyzed for native functions for type constraint analysis purposes, and native functions are left in their original form. However, the return types of native functions should be known. A native function may declare an object return type and possibly return objects that are subclasses of the declared return type. Based on return type behavior, native functions fall into three categories: (1) those that always return the declared type, (2) those that return a fixed set of types, and (3) those that return types that vary according to the input parameters of the function.

To handle case 2, a record may be created for a native function that specifies a list of possible return types.

To handle case 3, such record may instead refer to a generic routine that may be called to determine the possible return types, i.e. a routine within a DLL. If no such record exists, then it is assumed that the return type is exactly the same as the declared type. For case 3, several native functions are of interest, which work with runtime type information (RTI). RTI refers to determining the members of a class while a program is executing. RTI is also known as metadata or reflection. A common motivation for using runtime type information is the capability of designing user interfaces or communications protocols that are not specific to any class.

To make use of RTI, a set of native functions provide access to such information. These functions generally fall into two categories: functions that reveal type information, and functions that act upon type information to call a method or create an object. Examples of such functions (in the Microsoft.Net environment) include "Type.GetProperties", "Type.GetFields", "Type.GetMethods", "PropertyInfo.GetGetMethod", "PropertyInfo.SetValue", "MethodInfo.Invoke", etc.

Specialized type constraint analysis is performed for these native functions. Typical RTI discovery functions take an object or object type as an input parameter and return an array of members. Each case is handled by a specialized function that determines the return type constraints based on the input type constraints, according to the specification of the function. The signature of such function is as follows:
void EvaluateNativeFunctionTypeConstraints (CALLFRAME*pCallframe).

Such functions get the parameter constraints from the CALLFRAME 409 structure and then set parameter constraints on any output parameters or return values. For example, a handler for the "Type.GetMethods" method sets the return value graph linked-list to an OBJREF 406 structure A pointing to an OBJDEF 405 structure B representing an array. OBJDEF 405 structure B has its array element linked-list set to a chain of OBJREF 406 structures C, k here each element of the linked-list C points to a unique OBJDEF 405 structure D, and each D carries a metadata token of an associated METHOD 403. Calling this special handler does not in itself cause all of the associated METHODs to be included, just as calling "Type.GetMethods" would not by itself result in code calling the returned methods. Rather, when later code attempts to invoke such a method, the "Load Function" and "Call Indirect" instructions are called which result in inclusion of the methods.

The following provide examples of the type constraint analysis, according to the adaptive aspects of the present invention:

EXAMPLE 1

Consider a Program Written in the C# Language Compiled to Microsoft .NET Common Language Runtime

```
Program:
static void main( )
{
Stream x = new FileStream("file.dat");
x.WriteByte(255);
}
```

This program opens a file and writes a byte to the file. The FileStream class is used for general input and output (I/O) to files within a file system. The FileStream class inherits from the Stream class. The Stream class is a generic class which defines a set of virtual functions that are common to input/output in general. Other classes that derive from the Stream class may be used for network I/O, device I/O, etc.

In this program, x is declared as a Stream, but set to a FileStream. When the WriteByte function is called, it is resolved to the FileStream.WriteByte function, and not the more general Stream.WriteByte function.

The foregoing program, when compiled to Microsoft Intermediate Language (MSIL) (Microsoft.Net), takes the following form:

```
static void main( )
{
.loc.0 Stream x
ldstr "file.dat"
newobj FileStream(string)
stloc.0
ldloc.0
ldc.i4 255
callvirt Stream.WriteByte(int)
}
```

The program in intermediate language form defines a local variable of type Stream and makes a virtual function call to Stream.WriteByte, which is resolved to FileStream.WriteByte at the time of program execution.

In order to determine the dependencies of such a program the virtual function call must be resolved by determining the type of the "this" pointer on the stack when Stream.WriteByte gets called. The type analysis is performed by the adaptive aspects of the present invention, at each instruction and the results are illustrated as follows:

TABLE I

| Instruction | Local Variables | Evaluation Stack after instruction |
|---|---|---|
| ldstr "file.dat" | | {string} |
| newobj FileStream(string) | | {FileStream} |
| stloc.0 | 0:FileStream | { } |
| ldloc.0 | 0:FileStream | {FileStream} |
| ldc.i4 255 | 0:FileStream | {FileStream, integer} |
| callvirt Stream.WriteByte(int) | 0:FileStream | { } |

The next table (Table II) illustrates the type graphing Structure manipulation for each instruction. The operations illustrate the net effect of changes made to structures using actual indexes and conditions as they apply to the sample program. The operations are illustrated in C++ syntax using the structures of FIG. 4A.

TABLE II

| Instruction | Type Graph Operations |
|---|---|
| (initialization of type graph call frame) | CALLFRAME* C = new CALLFRAME( );<br>C->Method = {main};<br>C->Stack = new (OBJREF*)[2];<br>C->Locals = new (OBJREF*)[1]; |
| ldstr "file.dat" | C->Stack[0] = NULL; |
| newobj FileStream(string) | C->Stack[1] = C->Stack[0];<br>C->Stack[0] = new OBJREF( );<br>C->Stack[0]->Def = new OBJDEF( );<br>C->Stack[0]->Def->Type = {FileStream};<br>CALLFRAME* D = new CALLFRAME( );<br>D->Method = {FileStream.ctor}<br>D->Args = &C->Stack[0];<br>{analyze FileStream..ctor function} |
| stloc.0 | C->Locals[0] = C->Stack[0];<br>C->Locals[0]->Owned = TRUE; |
| ldloc.0 | C->Stack[0] = C->Locals[0]; |
| ldc.i4 255 | C->Stack[1] = NULL; |
| callvirt Stream.WriteByte(int) | {resolve virtual function}<br>{analyze FileStream.WriteByte function} |

A more complex example is presented that demonstrates fields, arrays, return values, and parameter passing. This second example is composed of the following source code:

```
static void main( )
{
Document[ ] docs = new Document[2];
docs[0] = new Document("c:/myfile.dat");
docs[1] = new Document("ftp:// mysite.com/myfile");
Stream x = docs[0].GetStream( );
x.WriteByte(255);
}
class Document
{
Stream m_stream;
public void Document(string url)
{
if(url.StartsWith("ftp:")
{
m_stream = new FtpStream(url);
}
else
{
m_stream = new FileStream(url);
}
}
public Stream GetStream( )
{
return m_stream;
}
}
```

This program, when compiled to Microsoft Intermediate Language (MSIL), takes on the following form:

```
.method entrypoint static void main( )
{
.loc.0 Document[ ] docs
.loc.1 Stream x
ldc.i4 2
newarr Document
stloc.0
ldloc.0
ldc.i4 0
ldstr "c:/myfile.dat"
newobj Document(string)
stelem.ref
ldloc.0
ldc.i4 1
ldstr "ftp:// mysite.com/myfile"
newobj Document(string)
stelem.ref
ldloc.0
ldc.i4 0
ldelem.ref
callvirt Stream Document.GetStream( )
stloc.1
ldloc.1
ldc.i4 255
callvirt Stream.WriteByte(int)
}
class Document
{
.field Stream m_stream;
.method .ctor(string url)
{
ldarg.1
ldstr "ftp:"
call bool String.StartsWith(string)
brfalse #9
ldarg.0
ldarg.1
newobj FtpStream(string)
stfld m_stream
br #13
#9: ldarg.0
ldarg.1
newobj FileStream(string)
stfld m_stream
#13: ret
}
.method Stream GetStream( )
{
ldarg.0
ldfld m_stream
ret
}
}
```

The summary of calculated types is as follows:

| Instruction | Local Variables | Evaluation Stack |
|---|---|---|
| main( ) | | |
| ldc.i4 2 | | {int} |
| newarr Document | | {Document[ ]} |
| stloc.0 | 0:Document[ ] | { } |
| ldloc.0 | 0:Document[ ] | {Document[ ]} |
| ldc.i4 0 | 0:Document[ ] | {Document[ ], int} |
| ldstr "c:/myfile.dat" | 0:Document[ ] | {Document[ ], int, string} |
| newobj Document(string) | 0:Document[ ] | {Document[ ], int, Document} |
| stelem.ref | 0:Document[ ] | { } |
| ldloc.0 | 0:Document[ ] | {Document[ ]} |
| ldc.i4 0 | 0:Document[ ] | {Document[ ], int} |
| ldstr "ftp:/mysite.com/myfile" | 0:Document[ ] | {Document[ ], int, string} |
| newobj Document(string) | 0:Document[ ] | {Document[ ], int, Document} |
| stelem.ref | 0:Document[ ] | { } |
| ldloc.0 | 0:Document[ ] | {Document[ ]} |
| ldc.ir 4 | 0:Document[ ] | {Document[ ], int} |
| ldelem.ref | 0:Document[ ] | {Document} |
| callvirt Document.GetStream( ) | 0:Document[ ] | {FtpStream|FileStream} |
| stloc.1 | 0:Document[ ], 1:FtpStream|FileStream | { } |
| ldloc.1 | 0:Document[ ], 1:FtpStream|FileStream | {FtpStream|FileStream} |
| ldc.i4 255 | 0:Document[ ], 1:FtpStream|FileStream | {FtpStream|FileStream, int} |
| callvirt Stream.WriteByte( ) | 0:Document[ ], 1:FtpStream|FileStream | { } |

-continued

| Instruction | Local Variables | Evaluation Stack |
|---|---|---|
| Document/.ctor | | |
| ldarg.1 | | {string} |
| ldstr "ftp:" | | {string, string} |
| call String.StartsWith(string) | | {bool} |
| brfalse #9 | | { } |
| ldarg.0 | | {Document} |
| ldarg.1 | | {Document, string} |
| newobj FtpStream(string) | | {Document, FtpStream} |
| stfld m_stream | | { } |
| br #13 | | { } |
| ldarg.0 | | {Document} |
| ldarg.1 | | {Document, string} |
| newobj FileStream(string) | | {Document, FileStream} |
| stfld m_stream | | { } |
| Ret | | { } |
| Document/GetStream | | |
| ldarg.0 | | {Document} |
| ldfld m_stream | | {FtpStream|FileStream} |
| Ret | | { } |

The type graphing structure manipulation is as follows (Page 34).

| Instruction | Type Graph Operations |
|---|---|
| main( ) | CALLFRAME* C = new CALLFRAME( ); |
| | C->Method = {main}; |
| | C->Stack = new (OBJREF*)[2]; |
| | C->Locals = new (OBJREF*)[1]; |
| ldc.i4 2 | C->Stack[0] = NULL; |
| newarr | C->Stack[0] = new OBJREF( ); |
| Document | C->Stack[0]->Type = {Document}; |
| Stloc.0 | C->Locals[0] = C->Stack[0]; |
| | C->Locals[0]->Owned = TRUE; |
| Ldloc.0 | C->Stack[0] = C->Locals[0]; |
| ldc.i4 0 | C->Stack[1] = NULL; |
| Ldstr | C->Stack[2] = NULL; |
| "c:/myfile.dat" | |
| newobj | C->Stack[3] = C->Stack[2]; |
| Document(string) | C->Stack[2] = new OBJREF( ); |
| | C->Stack[2]->Def = new OBJDEF( ); |
| | C->Stack[2]->Def->Type = {Document}; |
| | CALLFRAME* D = new CALLFRAME( ); |
| | D->Method = {Document.ctor} |
| | D->Args = &C->Stack[2]; |
| | {analyze Document..ctor function} |
| stelem.ref | C->Stack[0]->Elements = C->Stack[2]; |
| ldloc.0 | C->Stack[0] = C->Locals[0]; |
| ldc.i4 0 | C->Stack[1] = NULL; |
| ldstr | C->Stack[2] = NULL; |
| "ftp:/mysite.com/myfile" | |
| newobj | C->Stack[3] = C->Stack[2]; |
| Document(string) | C->Stack[2] = new OBJREF( ); |
| | C->Stack[2]->Def = new OBJDEF( ); |
| | C->Stack[2]->Def->Type = {Document}; |
| | CALLFRAME* D = new CALLFRAME( ); |
| | D->Method = {Document.ctor} |
| | D->Args = &C->Stack[2]; |
| | {analyze Document..ctor function} |
| stelem.ref | C->Stack[0]->Elements = C->Stack[2]; |
| ldloc.0 | C->Stack[0] = C->Locals[0]; |
| ldc.ir 4 | C->Stack[1] = NULL; |
| ldelem.ref | C->Stack[0] = C->Stack[0]->Elements; |
| callvirt | CALLFRAME* D = new CALLFRAME( ); |
| Document.GetStream( ) | D->Method = {Document.GetStream}; |
| | D->Stack = new (OBJREF*)[1]; |
| | D->Args = &C->Stack[0]; |
| | {analyze Document.GetStream function} |
| | C->Stack[0] = D->RetVals; |
| stloc.1 | C->Locals[1] = C->Stack[0]; |
| ldloc.1 | C->Stack[0] = C->Locals[1]; |
| ldc.i4 255 | C->Stack[1] = NULL; |
| callvirt | CALLFRAME* D1 = new CALLFRAME( ); |
| Stream.WriteByte( ) | D1->Method = {FtpStream.WriteByte}; |
| | D1->Stack = new (OBJREF*)[1]; |
| | D1->Args = &C->Stack[0]; |
| | {analyze FtpStream.WriteByte function} |
| | CALLFRAME* D2 = new CALLFRAME( ); |
| | D2->Method = {FileStream.WriteByte}; |
| | D2->Stack = new (OBJREF*)[1]; |
| | D2->Args = &C->Stack[0]; |
| | {analyze FtpStream.WriteByte function} |
| Document/.ctor | {C is passed in as the local CALLFRAME} |
| ldarg.1 | C->Stack[0] = C->Args[1]; |
| ldstr "ftp:" | C->Stack[1] = NULL; |
| call | CALLFRAME* D = new CALLFRAME( ); |
| String.StartsWith(string) | D->Method = {String.StartsWith}; |
| | D->Args = &C->Stack[0]; |
| | {analyze String.StartsWith function} |
| | C->Stack[0] = NULL; |
| brfalse #9 | |
| ldarg.0 | C->Stack[0] = C->Args[0]; |
| ldarg.1 | C->Stack[1] = C->Args[1]; |
| newobj | C->Stack[2] = C->Stack[1]; |
| FtpStream(string) | C->Stack[1] = new OBJREF( ); |
| | C->Stack[1]->Def = new OBJDEF; |
| | C->Stack[1]->Def->Type = {FtpStream}; |
| | CALLFRAME* D = new CALLFRAME( ); |
| | D->Method = {FtpStream.ctor} |
| | D->Args = &C->Stack[1]; |
| | {analyze FtpStream..ctor function} |
| stfld | C->Stack[0]->Fields = new OBJFIELDREF( ); |
| m_stream | C->Stack[0]->Fields->Field = {m_stream}; |
| | C->Stack[0]->Fields->Ref = C->Stack[1]; |
| | C->Stack[0]->Fields->Ref->Owned = TRUE; |
| br #13 | |
| ldarg.0 | C->Stack[0] = C->Args[0]; |
| ldarg.1 | C->Stack[1] = C->Args[1]; |
| newobj | C->Stack[2] = C->Stack[1]; |
| FileStream(string) | C->Stack[1] = new OBJREF( ); |
| | C->Stack[1]->Def = new OBJDEF; |
| | C->Stack[1]->Def->Type = {FileStream}; |
| | CALLFRAME* D = new CALLFRAME( ); |
| | D->Method = {FileStream.ctor} |
| | D->Args = &C->Stack[1]; |
| | {analyze FileStream..ctor function} |
| stfld | C->Stack[0]->Fields->Ref->Link = C->Stack[1]; |
| m_stream | C->Stack[0]->Fields->Ref->Link->Owned = TRUE; |

-continued

| Instruction | Type Graph Operations |
|---|---|
| Ret | |
| Document/GetStream | {C is passed in as the local CALLFRAME} |
| ldarg.0 | C->Stack[0] = C->Args[0]; |
| ldfld m_stream | C->Stack[0] = C->Stack[0]->Fields->Ref; |
| Ret | |

It is noteworthy that in the above sample both FileStream and FtpStream types are instantiated, however, the WriteByte( ) function is only called for the FileStream type. The above analysis results in the FileStream.WriteByte( ) function being included and the FtpStream.WriteByte function being excluded. Prior art using flow-insensitive type constraint analysis would result in both FileStream.WriteByte and FtpStream.WriteByte functions being included, as both types are instantiated, even though the FtpStreamWriteByte function never gets called. This demonstrates the advantage of flow-sensitive type constraint analysis, resulting in much smaller applications, according to one aspect of the present invention.

While the above examples demonstrate the incremental savings of a single function, this scenario is significant in practice for modern MRTE implementations such as the Microsoft .NET Framework. For example, using flow-insensitive analysis of prior art, calling the "Object.ToString" function on a single type, results in the inclusion of the derived ToString function on every type that is instantiated, and each such function calls into many other functions, resulting in applications that are larger than ones using the flow-sensitive type constraint analysis of the present invention.

Figure 24:
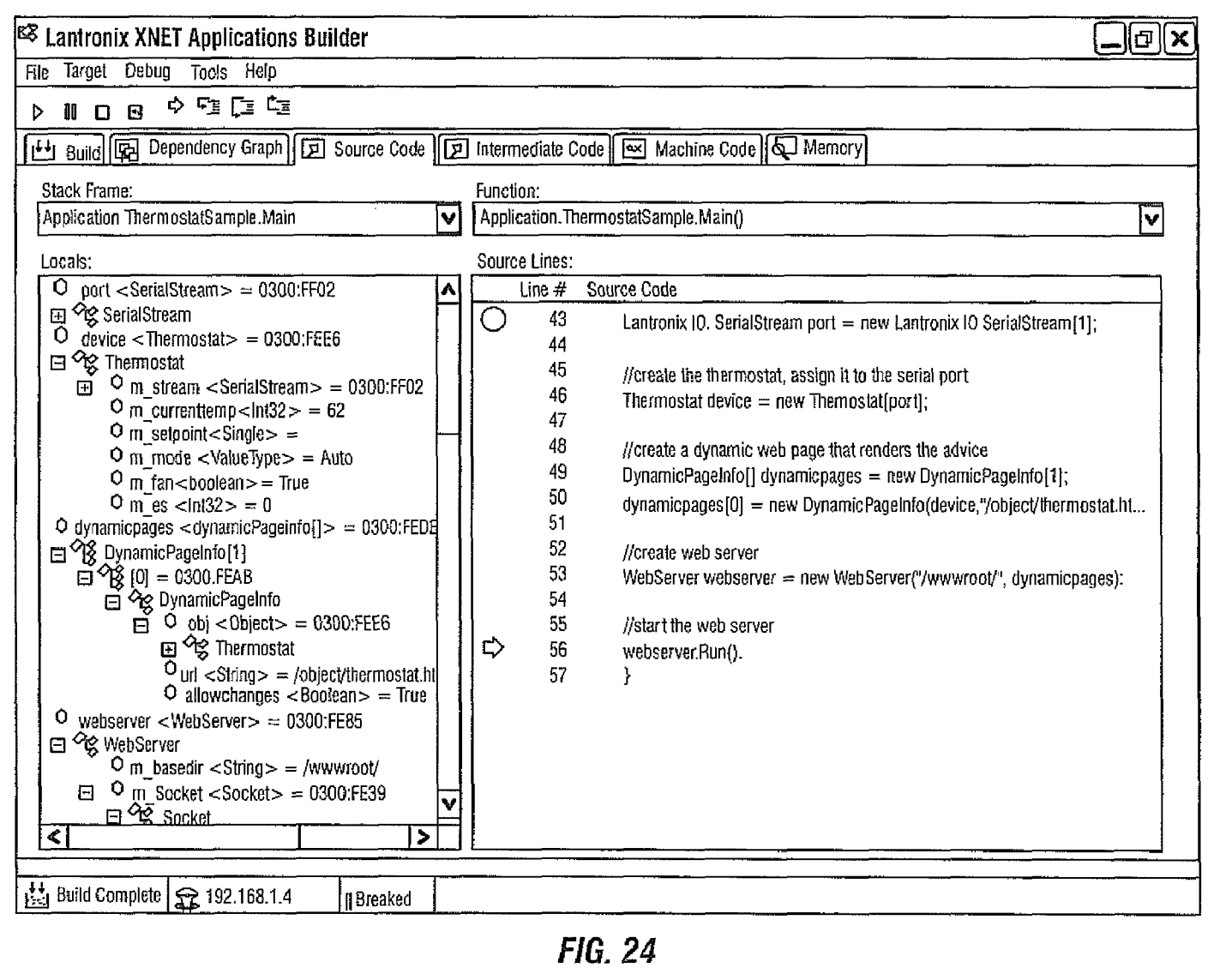
Figure 25:
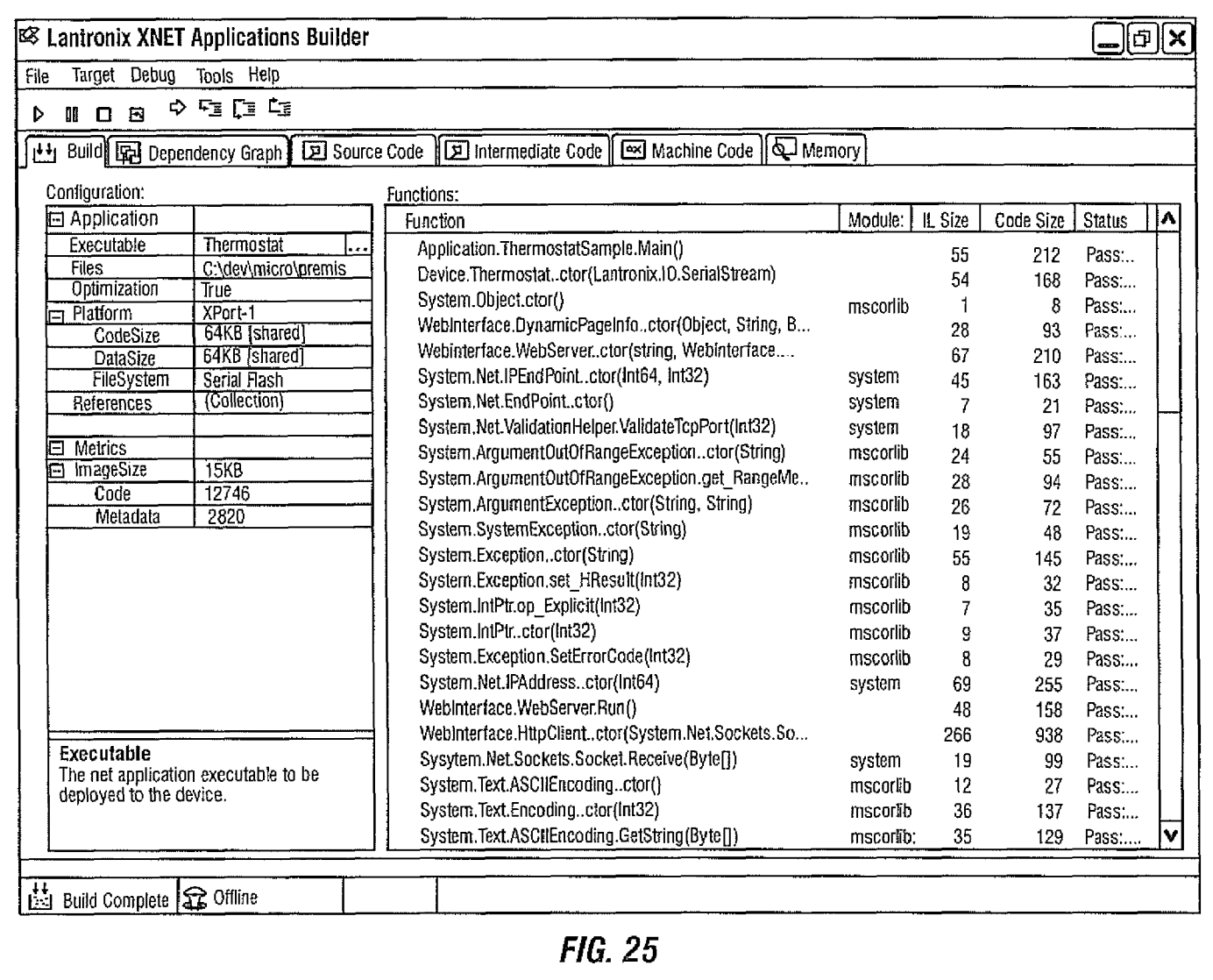
Figure 26:
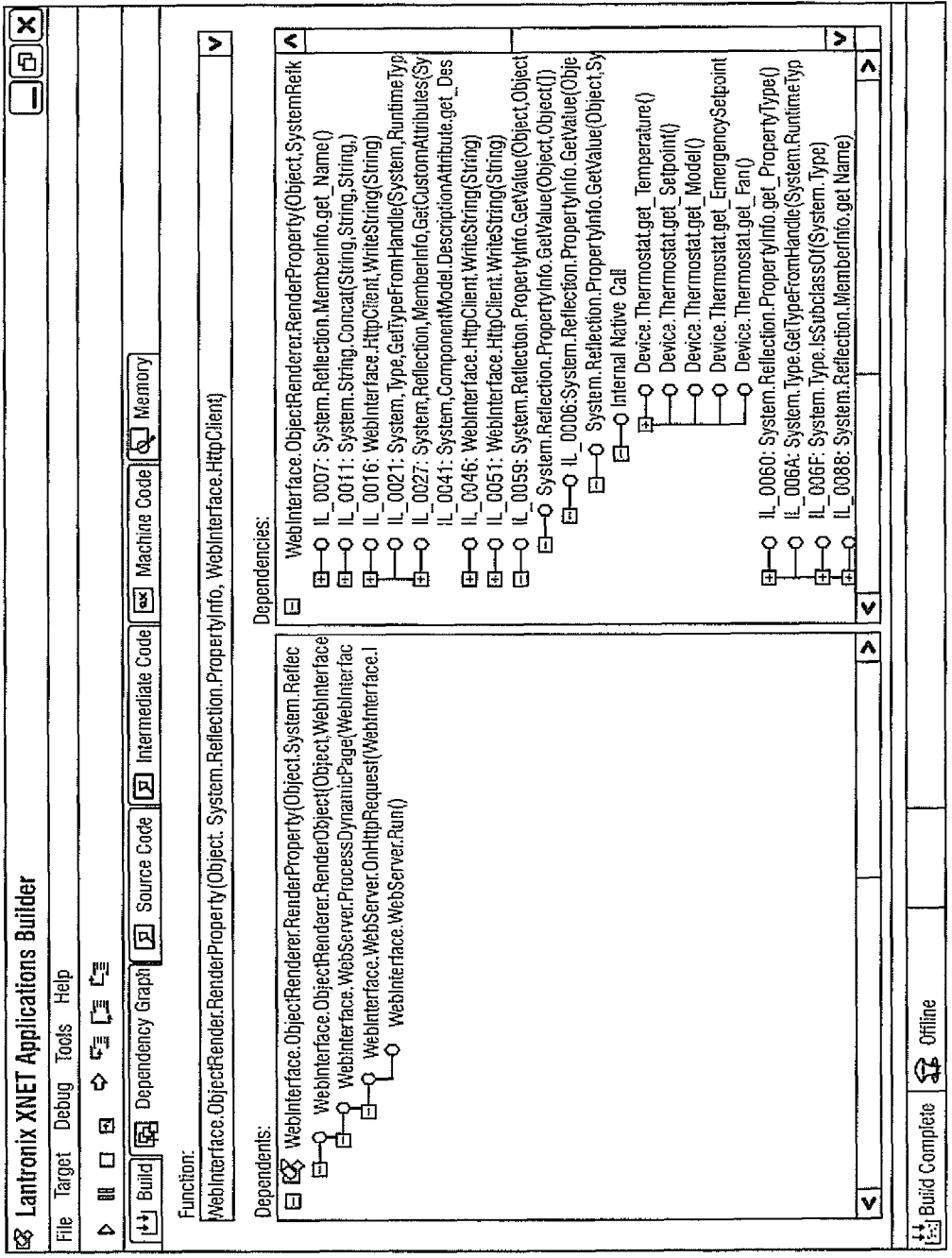

FIGS. 24-26 show screen shots of application builder 200, using the foregoing process steps, i.e., debugging source code instructions, graphing dependencies between functions and compiling each dependent function of an executable files to run on a target platform.

In yet another aspect of the present invention, a method is provided for determining variable(s) size(s) such that the runtime size of a variable is smaller than the declared size if the value is constrained to fit within a discrete size. One beneficial use of this method is to convert software applications designed for 32-bit environments to run efficiently within 16-bit environments, where 32-bit integer variables can be safely truncated to 16-bit integer variables in cases where it is possible for 32-bit values to represented by 16 bits.

The method determines variable sizes relating to parameters passed to functions as well as fields of an object. Reducing the size of parameters results in smaller code, while reducing the size of fields' results in smaller data structures.

Figure 27:
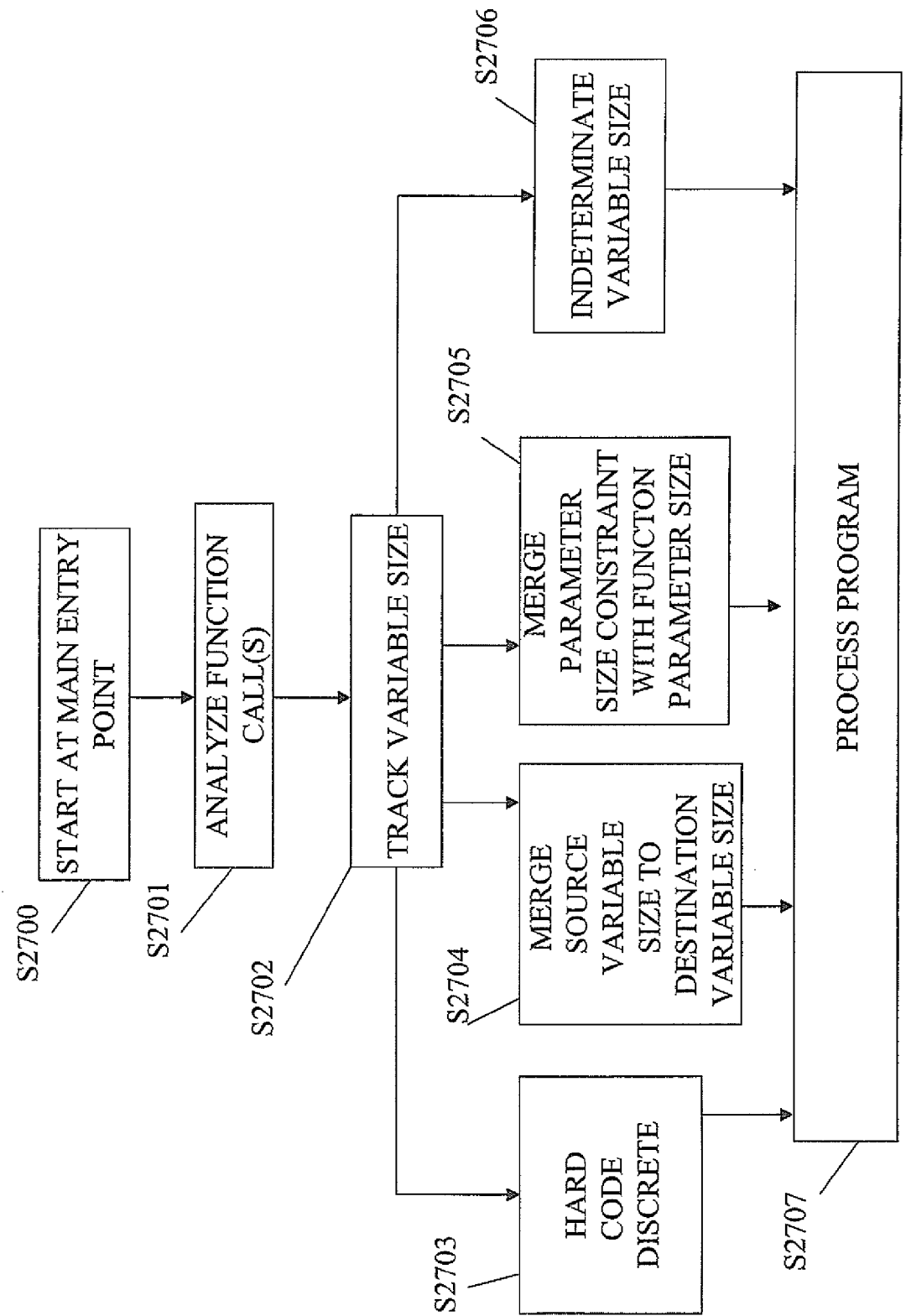
FIG. 27 is a flow diagram of process steps for determining required sizes of variables, according to one aspect of the present invention.

FIG. 27 shows a flow diagram of executable process steps for determining variable size within programs (software applications). Turning in detail to FIG. 27, in step S2700, the process starts at the main entry point of the program, as discussed above.

In step S2701, program function calls are analyzed recursively and the size for each variable is tracked in step S2702.

In step S2703, if a variable is discrete, that is, it is hardcoded to a specific value, then that variable is constrained to a single value.

In step S2704, if a variable is assigned to another variable, the size constraint of the source variable is merged with the size constraint of the destination variable. Merging a constraint involves creating a combined set of values that includes one or more discrete values. If any one of the size constraints of the merged values is indeterminate, then the merged size constraint is indeterminate (step S2706).

In step S2705, if a variable is passed as a parameter to a function, the size constraint of the parameter variable is merged with the size constraint of the function's parameters (that is, if there are multiple call paths to a function, then the size constraints of each call path are merged.)

If a variable is modified by a relative amount (any modification other than direct assignment), the size constraint of the variable becomes indeterminate (step S2706).

If an arithmetic operation is performed, the size constraint of the result is determined by the size constraints of the operands for the specific operation. For example, adding two signed integers where it can be proven that the result is less than 32768, yields a result consisting of a corresponding size constraint.

If a variable is subject to external modification, the size constraint of the variable is indeterminate (step S2706). An example of this is when a variable is returned from a function outside the system where no size constraint is available, such as a function that might return a number from a string, or a function that reads numbers over a network connection.

In step S2707, the program is processed. In this case, the program is processed with both 16 bit and 32-bit values (where values are indeterminate i.e. a 32 bit value cannot be represented by 16 bits, step S2706). If all 32 bit values can be represented as 16 bit values, then the program is run on the 16 bit representation.

An example of the foregoing process is provided as follows:

```
void Main( )
{
int32 X = 10;
int32 Z = Foo(X, 4);
}
int32 Foo(int32 A, int32 B)
{
return A + B;
}
```

This example is effectively transformed to the following code in IL 202:

```
void Main( )
{
int16 X = 10;
int16 Z = Foo(X, 4);
}
int16 Foo(int16 A, int16 B)
{
return A + B;
}
```

In the foregoing example, X can only be 10, and fits within 16 bits. Both parameters passed to function Foo (X and immediate value 4) fit within 16 bits. Within the function Foo, an addition operation is performed on A and B, and the result is assigned to the return value.

If the example is modified, such that X is 100,000 or indeterminate, then A would remain 32-bit, B would be 16-bit, and the result of the Foo function would remain 32-bit.

The foregoing process provides substantial reductions on programming platforms where 32-bit parameters are commonly declared but the range typically consists of small static numbers. An example of such a function is the "Socket constructor" in Microsoft .NET:

```
void Socket(AddressFamily addressFamily, SocketType socketType,
    ProtocolType protocolType);
```

In this case, each of the parameters is typed as 32-bit integer enumerations, though the possible values can always be represented by 16 bits. This method can be used to reduce the size of runtime structures. An example is provided:

```
class Person
{
string  Name;
int32   Age;
int32   Weight;
int32   Height;
};
void Main( )
{
Person joe = new Person( );
joe.Name = "Joe";
joe.Age = 45;
}
```

This example is effectively transformed in IL 202 as following:

```
class Person
{
string  Name;
int16   Age;
};
void Main( )
{
Person joe = new Person( );
joe.Name = "Joe";
joe.Age = 45;
}
```

Since the Age field fits within 16 bits, it is truncated to 16-bits. The Weight and Height fields are never accessed, and hence, are removed. This results in the size of the structure being reduced from 16 bytes to 6 bytes.

A common occurrence of this is with many multi-purpose structures in .NET, where not all fields are used for certain structures, and where 32 bits are not required to represent smaller numbers.

Figure 28:
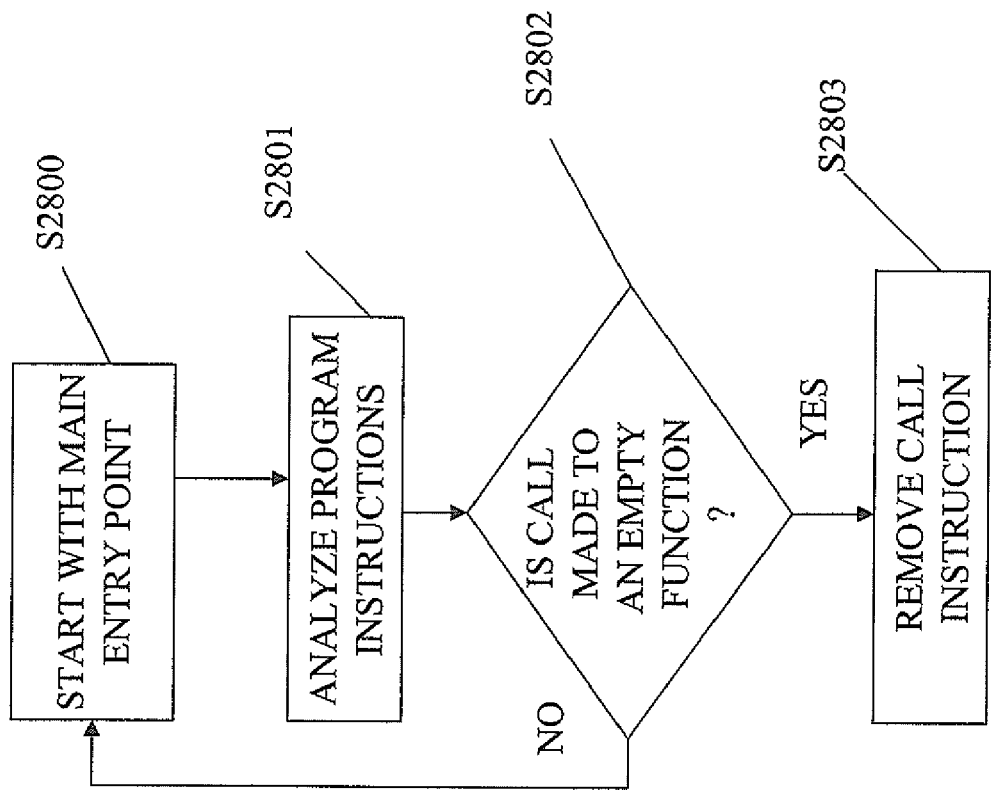
FIG. 28 is a flow diagram of process steps for eliminating function calls, according to one aspect of the present invention.
Figure 29:
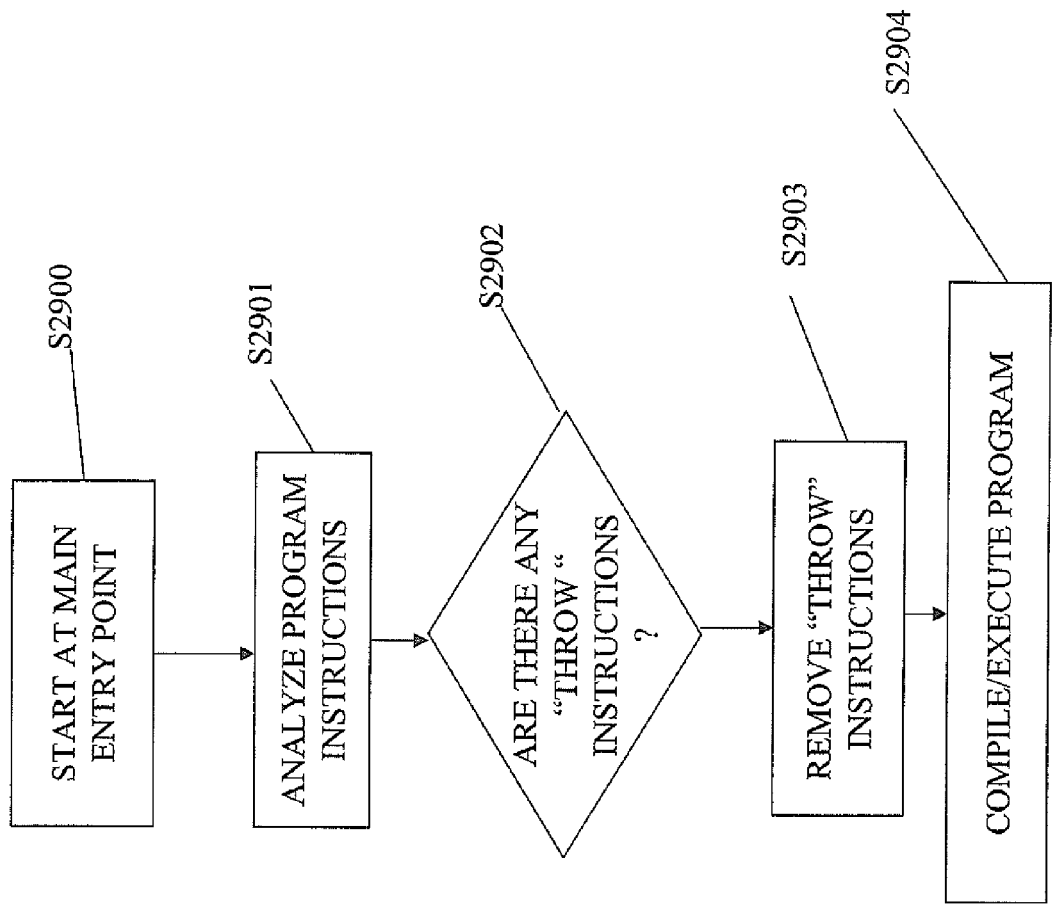
FIG. 29 is a flow diagram of process steps for handling "throw" instructions, according to one aspect of the present invention.
Figure 30:
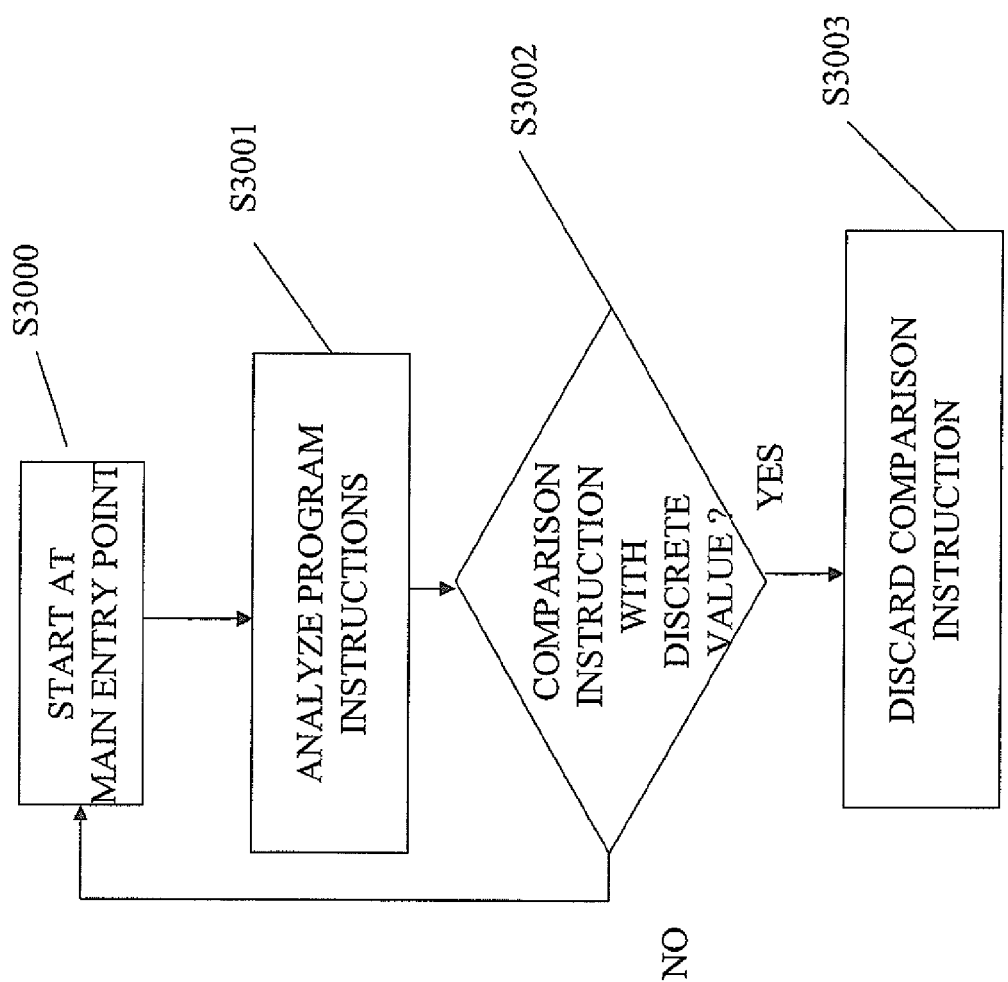
FIG. 30 is a flow diagram of process steps optimizing code by removing comparison instructions in a program, according to one aspect of the present invention.

In yet another aspect of the present invention, a method is provided for removing unneeded code by eliminating calls to empty functions, removing code that creates exceptions where exceptions are not handled, and removing code that checks values where the values can be determined in advance. FIGS. 28-30 illustrate process steps for this method, as described below.

FIG. 28 shows process steps for eliminating calls to empty functions. An empty function has no instruction. Turning in detail to FIG. 28, in step S2800, the process starts at the main entry of the program.

In step S2801, the process analyzes program instructions. This is performed at IL 202 level.

In step S2802, the process determines if a call is made to an empty function. If a call is not made to an empty function, the process reverts back to step S2800.

If a call is made to an empty function, then in step S2802, the process removes call and any preceding instruction that push parameters on a programmable stack for such empty function.

If the resulting optimization results in an empty caller function, then the foregoing process is repeated for the caller of that function. A common occurrence of this phenomena is within the Microsoft .NET® Framework, where constructors on objects always call base constructors and it is typical for many base constructors to not contain any code. The foregoing process makes applications efficient, especially for embedded systems.

FIG. 29 shows a process flow diagram of how "throw" instructions are handled. "Throw" instructions typically are used for error handling, according to yet another adaptive aspect of the present invention. For example, a program may have a throw instruction to access certain information from a website. However, if the network is down, then the instruction cannot be followed and an error message is sent. To handle this situation, programs use exception handlers. The adaptive aspect of the present invention streamlines the process where there are no exception handlers for "throw" instructions, as described below.

Turning in detail to FIG. 29, in step S2900, the process starts at the main entry of the program. In step S2901, the process analyzes program instructions. This may be done at the IL 202 level.

In step S2902, the process determines if there are any "throw" instructions without exception handlers. If there are none, the process reverts back to step S2900.

If there are "throw" instructions, without exception handlers, then the instructions are removed and the program is compiled/executed in step S2904 after the exception generation code is removed and replaced with minimal error-handling code such as an interrupt.

The foregoing process solves a problem that typically occurs with function-level parameter checking, where a programmer assumes that passed in parameters will always be correct and doesn't provide any specific exception handling code. In these cases, if an exception w ere to occur (which the programmer deems highly improbable), the exception generation code is removed and replaced with minimal error-handling code such as an interrupt, as described above.

FIG. 30 shows process steps for optimizing code by removing comparison instructions. The process starts in step S3000 at the main entry point. In step S3001, the process analyzes program instructions and tracks integer values (similar to step S2702, FIG. 27).

In step S3002, if the process finds a comparison instruction with a discrete value, then in step S3003, the process removes comparison instruction and code outside of the determined executing branch is discarded and the program is executed.

If a comparison instruction is not found, then the process reverts back to step S3000.

The foregoing process solves a common problem with function-level parameter checking, where a substantial portion of code is in place merely to validate parameter values that are under control of the programmer. Where it can be proven that such values are completely under programmer control (and can't be affected by user input or external conditions), this code can be safely eliminated without affecting program execution.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for building an application, comprising:

providing an application builder that receives source code instruction of a program; determining the minimum amount of optimum code requirement for the source code instruction; wherein the determining comprises: determining variable size of program functions in the program based on a set of constraints; wherein the determining variable size comprises: If a variable is discrete, hard-coding a single value; and if a first variable is assigned to a second variable, then merging a size constraint of the first variable into a size constraint of the second variable;

reducing the variable size of the program functions for program execution based on the determination of the variable size; and compiling the program functions into native processor functions comprising native functions that return a declared type, native functions that return a fixed set of types, and native functions that return types that vary according to input parameters of the native functions; wherein the compiling comprises performing specialized type constraint analysis for the native functions to determine return type constraints associated with the returns based on input type constraints according to the specification of the native functions.

2. The method of claim 1, wherein the optimum code requirement is determined by performing a flow-sensitive analysis that determines possible types of objects that may exist at any instruction of the program.

3. The method of claim 2, wherein based on a set of constraints, virtual functions that have the potential of being executed are determined.

4. The method of claim 1, wherein the optimum code requirement is determined by performing a flow-sensitive analysis that determines possible types of objects that may exist at any instruction of the program wherein the program runs in a managed runtime environment.

5. A computer readable storage medium storing computer-executable process steps of a process for building an application, comprising:

providing an application builder that receives source code instruction of a program;

determining the minimum amount of optimum code requirement for the source code instruction; wherein the determining comprises: determining variable size of program functions in the program based on a set of constraints; wherein the determining variable size comprises: If a variable is discrete, hard-coding a single value; and if a first variable is assigned to a second variable, then merging a size constraint of the first variable into a size constraint of the second variable;

reducing the variable size of the program functions for program execution based on the determination of the variable size; and compiling the program functions into native processor functions comprising native functions that return a declared type native functions that return a fixed set of types, and native functions that return types that vary according to input parameters of the native functions; wherein the compiling comprises performing specialized type constraint analysis for the native functions to determine return type constraints associated with the returns based on input type constraints according to the specification of the native functions.

6. The computer readable storage medium of claim 5, wherein the optimum code requirement is determined by performing a flow-sensitive analysis that determines possible types of objects that may exist at any instruction of the program.

7. The computer readable storage medium of claim 6, wherein based on a set of constraints, virtual functions that have the potential of being executed are determined.

8. The computer readable storage medium of claim 5, wherein the optimum code requirement is determined by performing a flow-sensitive analysis that determines possible types of objects that may exist at any instruction of the program wherein the program runs in a managed runtime environment.

* * * * *